United States Patent [19]

Koegel et al.

[11] Patent Number: 5,025,370
[45] Date of Patent: Jun. 18, 1991

[54] CIRCUIT FOR PREVENTING LOCK-OUT OF HIGH PRIORITY REQUESTS TO A SYSTEM CONTROLLER

[76] Inventors: Robert J. Koegel, 4621 Orchid La., Glendale, Ariz. 85302; Leonard Rabins, 8625 E. Monterosa, Scottsdale, Ariz. 85251

[21] Appl. No.: 902,544

[22] Filed: Sep. 2, 1986

[51] Int. Cl.$^5$ .............................................. G06F 11/00
[52] U.S. Cl. .................. 364/200; 364/241.2; 364/241.4
[58] Field of Search ... 364/200 MS File, 900 MS File

[56] References Cited

U.S. PATENT DOCUMENTS

| 4,085,444 | 4/1978 | Schneider | 364/900 |
| 4,148,011 | 4/1979 | McLagan | 364/900 |
| 4,181,933 | 1/1980 | Benysek | 364/200 |
| 4,445,197 | 4/1984 | Lorie et al. | 364/200 |
| 4,516,201 | 5/1985 | Warren et al. | 364/200 |

OTHER PUBLICATIONS

"Lockout Guidance Among Referencing Registers Cycle Stealing From a Common Memory", Bergey, Jr., IBM TDB, vol. 20, No. 10, Mar. 1978, p. 4131.

*Primary Examiner*—Gareth D. Shaw
*Assistant Examiner*—R. L. Rudolph
*Attorney, Agent, or Firm*—John S. Solakian; James H. Phillips

[57] ABSTRACT

Lock-out of pending higher high priority requests to a system controller is prevented by a circuit which comprises a counter element for counting the number of times the pending higher high priority request is not granted access. The counting results in a count value which is temporarily stored in the counter element. A compare element compares the count value to a predetermined value, the predetermined value being a predetermined number of times the data processing system will permit bypassing the pending higher high priority request. A control signal is outputted from the compare element when the count value is equal to the predetermined value and is coupled to each port to inhibit any further request for access from the equipment from being accepted by the system controller. The circuit also includes a latch element for maintaining the control signal when it is determined that a subsequent high priority request which is granted access is not the highest high priority request, the control signal being maintained until all pending high priority requests have been granted access.

3 Claims, 16 Drawing Sheets

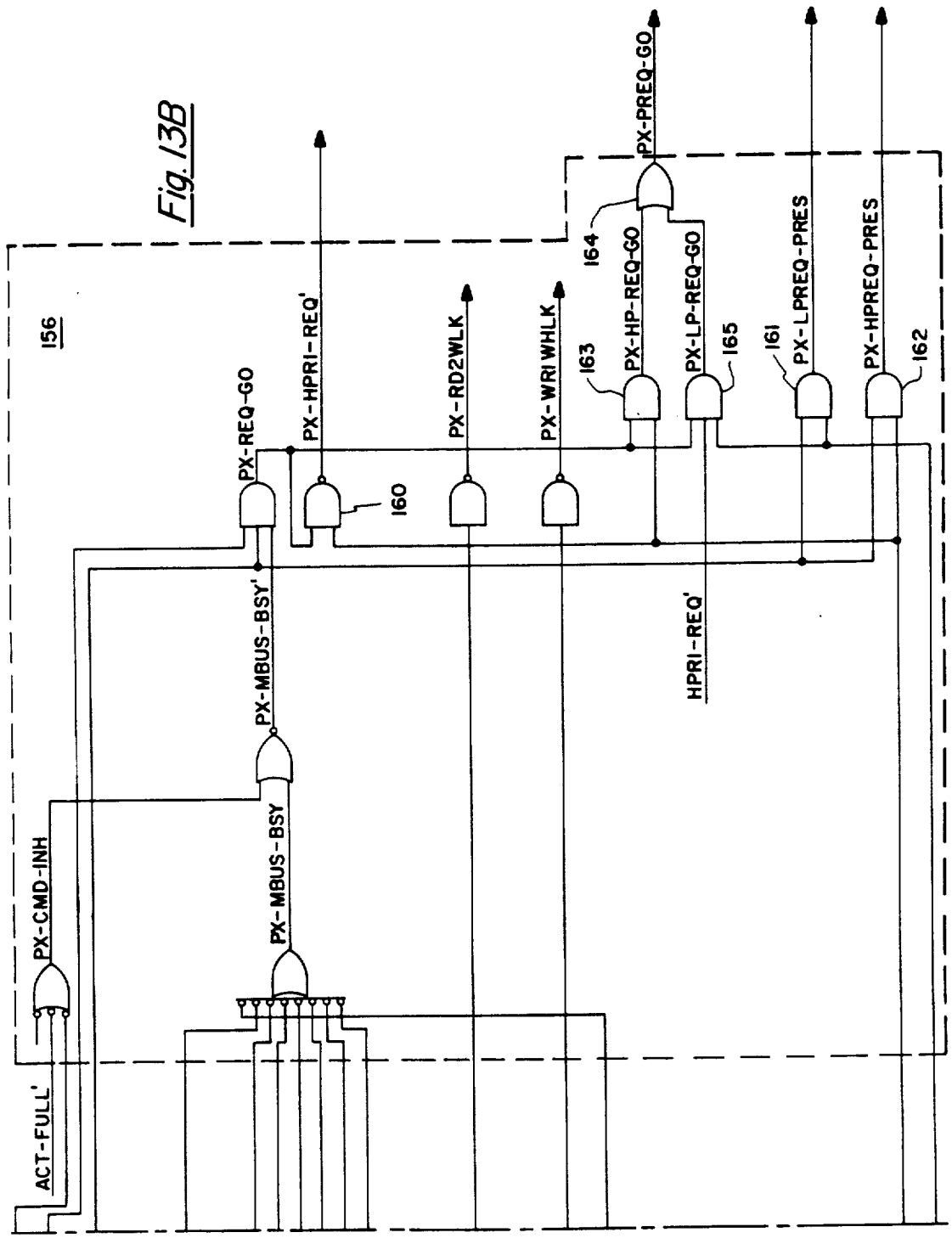

CIRCUIT FOR PREVENTING LOCK-OUT OF HIGH PRIORITY REQUESTS TO A SYSTEM CONTROLLER

RELATED PATENT APPLICATION The present patent application is related to U.S. Patent Application, Ser. No. 06/902,545, entitled "Apparatus for Controlling System Accesses Having Multiple Command Level Conditional Rotational Port Servicing Priority Hierarchy" by Robert J. Koegel, et al, filed on Sept. 2, 1986, and assigned to Honeywell Information Systems Inc., the assignee of the present application.

BACKGROUND OF THE INVENTION

This invention relates to a circuit for preventing predetermined command types to a system control unit of a data processing system from being locked out, and more particularly, to a signal generating circuit for preventing the lock-out of high priority requests to a system control unit having multiple command level conditional rotational servicing priority hierarchy.

System control units of present systems have included a port priority based on port group, and as a result, a blocked port may be bypassed. Blocked ports can occur especially in tandem configurations of data processing systems whereby two central processor units (CPUs) are making requests to each of two corresponding system controller units (SCUs) and two input/output (I/O) units are each connected to both SCUs. The present invention is incorporated in a system controller with a plurality of command types having a predetermined priority level. Port servicing of the system controller which incorporates the present invention is based upon two levels of commands, high and low, the high level commands having priority over low level commands. Each level is independent of the other. The priority within the level is rotated upon servicing a port, provided that a higher priority port within the level does not have a service request pending which is blocked due to some necessary portion of the system being unavailable. If it is determined that a lower high priority request has been serviced a predetermined number of times over a pending higher high priority request, the circuit of the present invention then generates a control signal such that the system controller inhibits further requests from the equipments (the CPUs and I/O units attached thereto) from being processed by the SCU. An individual port user may change its command level within the established system requirements if it is not selected in a predetermined select interval.

SUMMARY OF THE INVENTION

Therefore, there is provided by the present invention a circuit for preventing the lock-out of high priority requests to a system controller having multiple command level conditional rotational multiple port servicing priority hierarchy.

A data processing system includes a system controller for controlling access to at least one subsystem in response to a request for access from a plurality of equipments operatively connected to a corresponding port of the system controller. The request for access is one of a plurality of command levels wherein the command levels have a predetermined priority relative to each other, and further the ports have a predetermined port priority relative to each other within each command level. The port priority is conditionally rotated within the command level corresponding to the request for access from the equipment being granted access. The system controller includes a circuit for preventing lock-out of a pending higher high priority request. The circuit comprises a counter element for counting the number of times the pending higher high priority request is not granted access. The counting results in a count value which is temporarily stored in the counter element. A compare element, operatively connected to the counter element, compares the count value to a predetermined value, the predetermined value being a predetermined value being a predetermined number of times the data processing system will permit bypassing the pending higher high priority request. A control signal is outputted from the compare element when the count value is equal to the predetermined value. The control signal is coupled to each port to inhibit any further request for access from the equipments from being accepted by the system controller.

The circuit also includes a latch element, operatively connected to the compare element, for maintaining the control signal when it is determined that a subsequent high priority request which is granted access is not the highest high priority request, the control signal being maintained until all pending high priority requests have been granted access. A reset element, operatively connected to the counter element, resets the count value when a high priority request is granted access and no higher high priority request is pending.

Accordingly, it is an object of the present invention to provide a circuit for preventing lock-out of pending higher high priority requests.

It is another object of the present invention to provide a circuit for preventing lock-out of pending higher high priority requests to a system controller having multiple command priority levels and conditional rotational priority hierarchy.

It is still another object of the present invention to provide a circuit for preventing lock-out of pending higher high priority requests to a system controller having a plurality of command levels, each command level having a predetermined priority.

It is still a further object of the present invention to provide a circuit for preventing lock-out of pending higher high priority requests to a system controller having a plurality of command priority levels, each command level having a predetermined priority, each level being independent of the others.

It is yet another object of the present invention to provide a circuit for preventing lock-out of pending higher high priority requests to a system controller having a plurality of levels, each command level having a predetermined priority, each level being independent of the others, and the priority within each level of each port is rotated upon servicing a port, provided that a higher priority port within the level does not have a service request pending.

These and other objects of the present invention will become more apparent when taken in conjunction with the following description and attached drawings wherein like characters indicate like parts and which drawings form a part of the present application.

BRIEF DESCRIPTION OF THE DRAWINGS

FIGS. 13A and 13B, taken together comprise FIG. 13, shows a logic diagram of the port request control unit of the preferred embodiment of the present invention;

DETAILED DESCRIPTION

Figure 1:
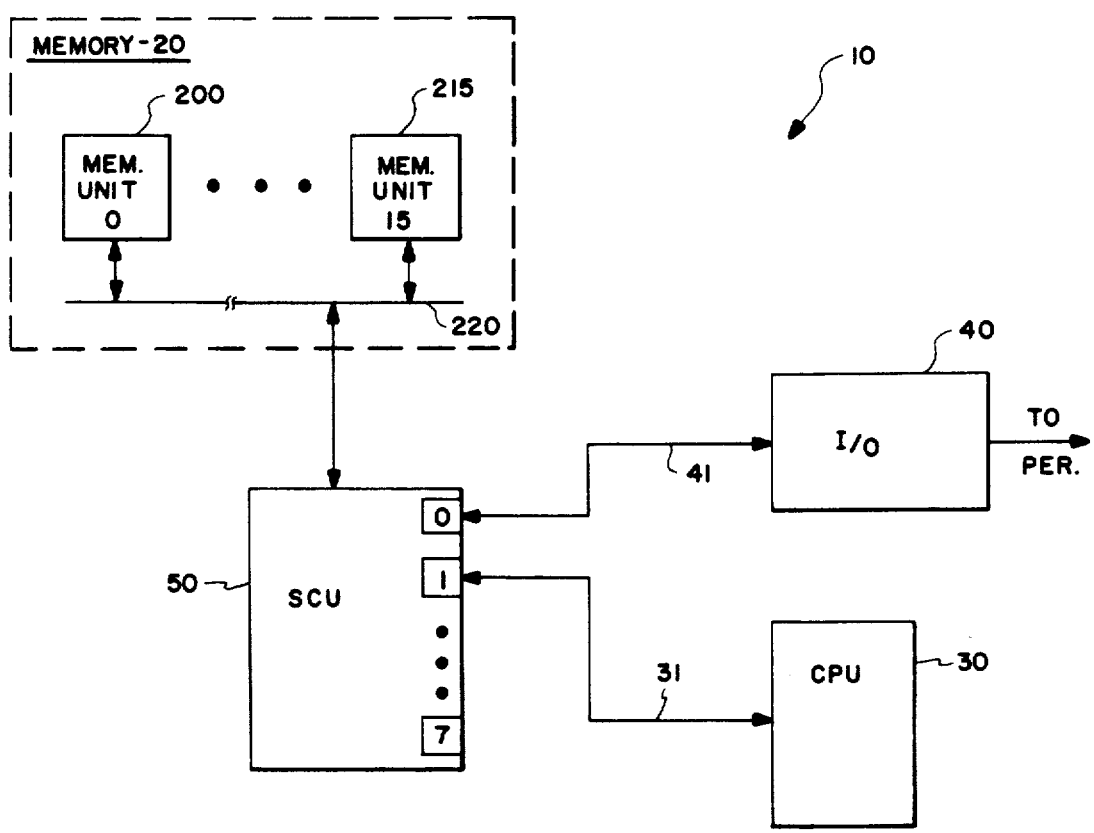
FIG. 1 shows a data processing system which includes a system control unit in which the circuit of the present invention may be found.

Referring to FIG. 1, there is shown a data processing system (DPS) 10 including a system control unit (SCU) 50 which incorporates the circuit of the present invention. In the DPS 10, there is included a memory 20, a central processing unit (CPU) 30, and an input/output I/O unit 40 which in turn interfaces with a variety of peripherals (PER). The CPU 30 and the I/O unit 40 interface with the memory 20 via a system control unit (SCU) 50. The CPU 30 and the I/O unit 40 make requests for the memory 20 in order to perform predetermined tasks of the DPS 10. The SCU 50 (or sometimes referred to as a memory controller) determines whether the CPU 30 or I/O unit 40 will gain access to the memory 20 when simultaneous, or near simultaneous, requests are made. In order to resolve conflicts in the request for access to the memory 20 (or for access to internal SCU registers), logic of the SCU 50 includes a priority scheme such that high priority requests will be granted first. Generally, the CPU 30 can afford to wait a small period of time before being granted access to the memory 20. In some cases, when the I/O unit 40 is interfacing with a device such as a disk file, the I/O unit 40 can not afford to wait due to the nature of the I/O (i.e., data transfer) occurring between the I/O unit 40 and the disk file. In some cases, the I/O unit 40 is interfacing with a peripheral which does not require fast accesses to the memory 20 in which case the I/O unit can then afford to wait. As a result, various type commands, such as high and low command priority levels, are incorporated into the DPS 10, the commands being issued by the equipments (i.e., the CPU 30 or the I/O unit 40 of the preferred embodiment of the DPS 10), to help insure a proper decision is made by the SCU 50 in granting access to the memory 20. The command format utilized in the preferred embodiment is shown in Table 1. The SCU 50 includes a plurality of ports, in the preferred embodiment the SCU 50 including ports 0 - 7, having an initial port priority based on port number within a command level. As a result of servicing a request from the I/O unit 40 or the CPU 30, or any additional equipments which may be connected to a corresponding port, the priority within a command level may be rotated in order to avoid a low priority port being blocked. Further, the rotation of the priorities is conditional upon there not being a higher priority request pending within a command level which has not been responded to. This further insures that a higher priority request will not be indefinitely passed over. Although only two command levels have been incorporated into the preferred embodiment it will be understood by those skilled in the art that the number of command levels may be increased. Further, although only ports 0 and 1 are utilized in the discussion of the preferred embodiment of the SCU 50, it will be understood that additional equipments may be interfaced to the available ports or that the number of ports may be modified.

The memory 20 of the preferred embodiment of the data processing system 10 includes sixteen memory units, memory unit 0 200 through memory unit 15 215, each memory unit 0–15 being connected to a bus 220, the bus 220 including an input bus and an output bus (not shown), the SCU 50 also being connected to the bus 220.

Between the SCU 50 and the CPU 30, and between the SCU 50 and the I/O unit 40, there exists an I/O protocol for the exchange of data via interconnecting lines 31, 41, respectively. When either the CPU 30 or the I/O unit 40 desires to access the memory 20, a request signal is set on the respective interconnecting lines 31', 41' these lines being part of the interconnecting lines 31, 41 shown. It is to be understood that interconnecting lines 31, 41, as well as bus 220 include data lines, address lines, and command and control lines. In addition, a signal indicating the command and a signal indicating the memory location is set on respective interconnecting lines 31'', 41'' by the requestor (i.e., the CPU 30 or the I/O unit 40). The logic of the SCU 50 determines whether or not to accept the request signal from the CPU 30 or the I/O unit 40. If predetermined conditions are satisfied (e.g., memory is available, ...), the request is accepted in accordance with the priority hierarchy of the logic of the SCU 50, and an accept signal is transmitted from the SCU 50 to the port, and in turn from the port to the CPU 30 or the I/O unit 40, allowing the data transfer between the port and the CPU 30 or the I/O unit 40 to take place in accordance with the established protocol. Of interest here, is the logic of the SCU 50 for accepting the request from the CPU 30 or the I/O unit 40 in accordance with the multiple command level conditional rotational multiple port servicing priority hierarchy of the present invention, and will be discussed in detail hereinunder. A discussion of the circuit of the present invention utilized in the SCU 50 will be discussed hereinunder. The transfer of data once the SCU 50 has accepted the CPU 30 or I/O unit 40 for data transfer is in accordance with the established protocol and is not relevant to the discussion of the SCU 50 or the circuit of the present invention and will not be discussed further herein.

TABLE 1

| COMMAND | BITS | | | | | |
|---|---|---|---|---|---|---|
| | 0 | 1 | 2 | 3 | 4 | 5 |
| READ GENERAL REGISTER, LOW PRIORITY | 0 | 0 | 0 | 0 | 0 | 0 |
| | 0 | 0 | 0 | 0 | 0 | 1 |
| | 0 | 0 | 0 | 0 | 1 | 0 |
| READ IC MASKS | 0 | 0 | 0 | 0 | 1 | 1 |
| | 0 | 0 | 0 | 1 | 0 | 0 |
| | 0 | 0 | 0 | 1 | 0 | 1 |
| | 0 | 0 | 0 | 1 | 1 | 0 |
| | 0 | 0 | 0 | 1 | 1 | 1 |
| | 0 | 0 | 1 | 0 | 0 | 0 |
| READ 2 CONNECT WORDS, HIGH PRIORITY | 0 | 0 | 1 | 0 | 0 | 1 |
| READ 2 INTERRUPT WORDS, HIGH PRIORITY | 0 | 0 | 1 | 0 | 1 | 0 |
| | 0 | 0 | 1 | 0 | 1 | 1 |
| | 0 | 0 | 1 | 1 | 0 | 0 |
| | 0 | 0 | 1 | 1 | 0 | 1 |
| | 0 | 0 | 1 | 1 | 1 | 0 |
| ACCEPT INTERRUPT/CONNECT, HIGH PRIORITY | 0 | 0 | 1 | 1 | 1 | 1 |
| READ 2 WORDS, LOW PRIORITY | 0 | 1 | 0 | 0 | 0 | 0 |
| READ 4 WORDS, LOW PRIORITY | 0 | 1 | 0 | 0 | 0 | 1 |
| READ 6 WORDS, LOW PRIORITY | 0 | 1 | 0 | 0 | 1 | 0 |
| READ 8 WORDS, LOW PRIORITY | 0 | 1 | 0 | 0 | 1 | 1 |
| READ 2 WORDS, CLEAR 1, LOW PRIORITY | 0 | 1 | 0 | 1 | 0 | 0 |
| READ 2 WORDS, CLEAR 2, LOW PRIORITY | 0 | 1 | 0 | 1 | 0 | 1 |
| READ MEMORY STATUS, REGISTER LOW PRIORITY | 0 | 1 | 0 | 1 | 1 | 0 |
| READ 2 WORDS, HIGH PRIORITY | 0 | 1 | 0 | 1 | 1 | 1 |
| READ 4 WORDS, HIGH PRIORITY | 0 | 1 | 1 | 0 | 0 | 0 |
| READ 6 WORDS, HIGH PRIORITY | 0 | 1 | 1 | 0 | 0 | 1 |
| READ 8 WORDS, HIGH PRIORITY | 0 | 1 | 1 | 0 | 1 | 0 |
| READ 2 WORDS, LOCK, HIGH PRIORITY | 0 | 1 | 1 | 0 | 1 | 1 |
| | 0 | 1 | 1 | 1 | 0 | 0 |
| READ 2 WORDS, CLEAR 1, HIGH PRIORITY | 0 | 1 | 1 | 1 | 0 | 0 |
| | 0 | 1 | 1 | 1 | 0 | 1 |
| READ 1 WORD, HIGH PRIORITY | 0 | 1 | 1 | 1 | 1 | 0 |
| READ MEMORY ID REGISTER, HIGH PRIORITY | 0 | 1 | 1 | 1 | 1 | 1 |
| WRITE GENERAL REGISTER, LOW PRIORITY | 1 | 0 | 0 | 0 | 0 | 0 |
| | 1 | 0 | 0 | 0 | 0 | 1 |
| | 1 | 0 | 0 | 0 | 1 | 0 |
| WRITE IC MASKS, LOW PRIORITY | 1 | 0 | 0 | 0 | 1 | 1 |
| | 1 | 0 | 0 | 1 | 0 | 0 |
| | 1 | 0 | 0 | 1 | 0 | 1 |
| | 1 | 0 | 0 | 1 | 1 | 0 |
| CLEAR ASSOCIATIVE MEMORY, LOW PRIORITY | 1 | 0 | 0 | 1 | 1 | 1 |
| WRITE 2 CONNECT WORDS, HIGH PRIORITY | 1 | 0 | 1 | 0 | 0 | 0 |
| | 1 | 0 | 1 | 0 | 0 | 1 |
| WRITE 2 INTERRUPT WORDS, HIGH PRIORITY | 1 | 0 | 1 | 0 | 1 | 0 |
| | 1 | 0 | 1 | 0 | 1 | 1 |
| | 1 | 0 | 1 | 1 | 0 | 0 |
| | 1 | 0 | 1 | 1 | 0 | 1 |
| | 1 | 0 | 1 | 1 | 1 | 0 |
| | 1 | 0 | 1 | 1 | 1 | 1 |
| WRITE 2 WORDS, LOW PRIORITY | 1 | 1 | 0 | 0 | 0 | 0 |
| WRITE 4 WORDS, LOW PRIORITY | 1 | 1 | 0 | 0 | 0 | 1 |
| WRITE 6 WORDS, LOW PRIORITY | 1 | 1 | 0 | 0 | 1 | 0 |
| WRITE 8 WORDS, LOW PRIORITY | 1 | 1 | 0 | 0 | 1 | 1 |
| WRITE 1 WORD ZONED, LOW PRIORITY | 1 | 1 | 0 | 1 | 0 | 0 |
| | 1 | 1 | 0 | 1 | 0 | 1 |
| | 1 | 1 | 0 | 1 | 0 | 0 |
| WRITE MEMORY STATUS | 1 | 1 | 0 | 1 | 1 | 1 |
| WRITE 2 WORDS, HIGH PRIORITY | 1 | 1 | 1 | 0 | 0 | 0 |
| WRITE 4 WORDS, HIGH PRIORITY | 1 | 1 | 1 | 0 | 0 | 1 |
| WRITE 6 WORDS, HIGH PRIORITY | 1 | 1 | 1 | 0 | 1 | 0 |
| WRITE 8 WORDS, HIGH PRIORITY | 1 | 1 | 1 | 0 | 1 | 1 |
| WRITE 1 WORD ZONED, HIGH PRIORITY | 1 | 1 | 1 | 1 | 0 | 0 |
| | 1 | 1 | 1 | 1 | 0 | 1 |

TABLE 1-continued

| COMMAND | BITS | | | | | |
|---|---|---|---|---|---|---|
| | 0 | 1 | 2 | 3 | 4 | 5 |
| WRITE 1 WORD ZONED HONOR LOCK, HIGH PRIORITY | 1 | 1 | 1 | 1 | 1 | 0 |
| WRITE MEMORY ID REGISTER, HIGH PRIORITY | 1 | 1 | 1 | 1 | 1 | 1 |

| BIT 0 TYPE | BIT 1 DESTINATION | BIT 2 PRIORITY | BIT 3-5 CODE |
|---|---|---|---|
| 0 = READ | 0 = SCU | 0 = LOW | |
| 1 = WRITE | 1 = MEMORY | 1 = HIGH | |

Figure 2:
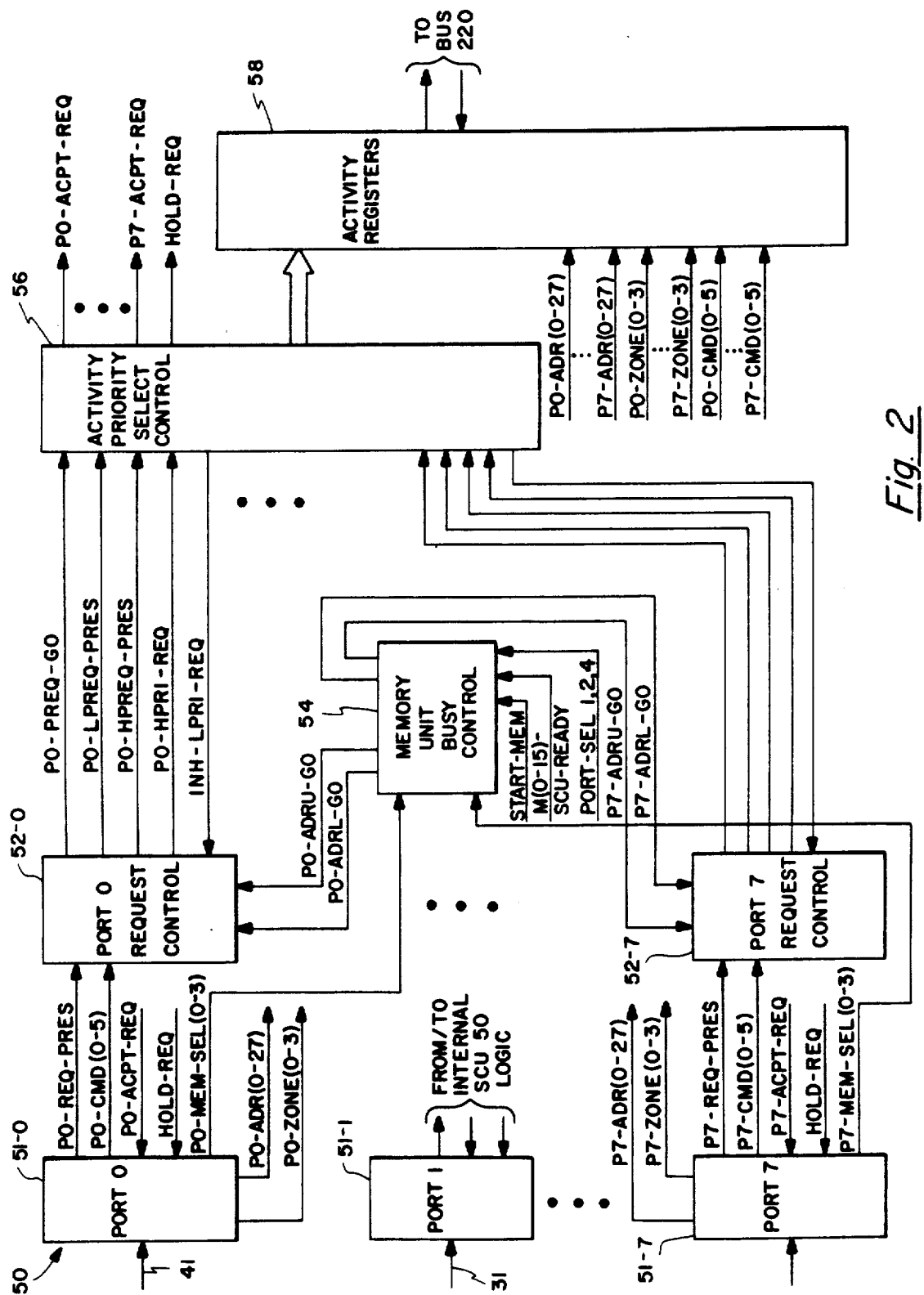
FIG. 2 shows a functional block diagram of the system control unit of the data processing system of FIG. 1.

Before discussing the circuit of the present invention, one should have a clear understanding of the SCU 50, which will now be described Referring to FIG. 2, there is shown a functional block diagram of the SCU 50. The SCU 50 of the preferred embodiment comprises eight ports, port 0–port 7, 51-0 through 51-7, each port being connected to a respective equipment. In the preferred embodiment of the SCU 50, port 0 51-0 is connected to I/O unit 40 (not shown) via interconnect line 41, and port 1 51-1 is connected to CPU 30 (not shown) via interconnect line 31. In the preferred embodiment of the SCU 50, the remaining ports, port 2–port 7 (51-2–51-7), are not coupled to any equipment. Each port, 51-0–51-7, is connected to a respective port request control, 52-0–52-7. The output of each port request control, port 0 request control 52-0, ... port 7 request control 52-7, couples corresponding specific request signals to an activity priority select control 56. Based on the timing of the request, the memory unit being selected, the type of request being made, and the availability of the hardware required in order to grant the request, the activity priority select control 56 accepts the request and couples an accept request signal, P0-ACPT-REQ, . . . P7-ACPT-REQ, to the corresponding port, port 0 51-0 . . . port 7 51-7. In addition, various control signals are coupled from the activity priority select control 56 to activity registers 58, and memory data registers (not shown) of the activity registers logic unit 58 for interfacing with the bus 220. In the preferred embodiment of the SCU 50, logic exists for providing up to five activities to be in process simultaneously, an activity being the acceptance of a port request. The activity priority select control 56 couples a control signal, HOLD-REQ, to hold any further requests from being coupled through the ports 51 when it is determined that a lower high priority request has been serviced a predetermined number of times over a pending higher high priority request. The HOLD-REQ signal is coupled to each of the ports, port 0 -51-0 through port 7 51-7. A discussion of the preferred embodiment of the circuit of the present invention is contained hereinunder. A memory unit busy control unit 54 is included for processing and maintaining information regarding the busy/unbusy status of memory unit 0 200 through memory unit 15 215. Corresponding status signals are coupled from the memory unit busy control 54 to the corresponding port request control logic 52-0 through 52-7.

Figure 3:
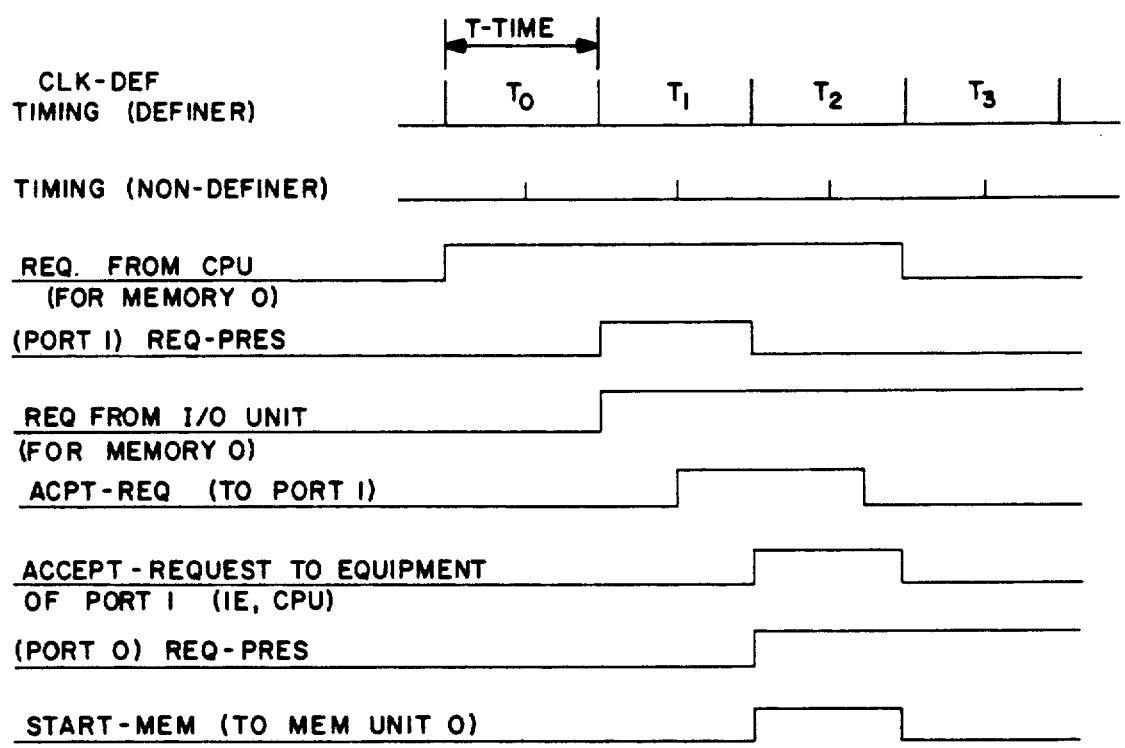
FIG. 3 shows a timing diagram of requests from two different the same memory unit.
Figure 4:
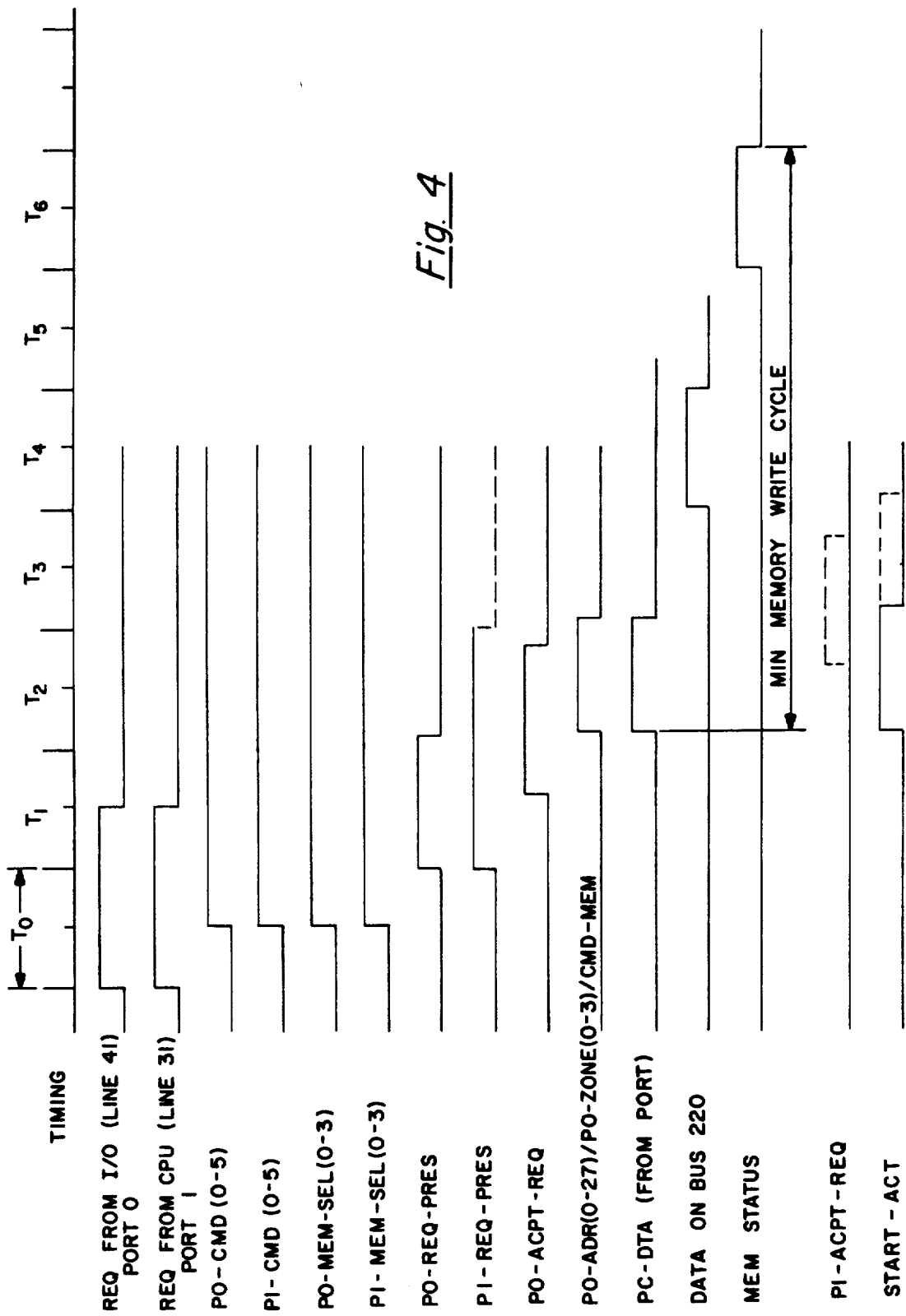
FIG. 4 shows a timing diagram of simultaneous requests from two different ports.

The acceptance of a port, thereby permitting communications with the SCU 50/memory 20 when simultaneous (or near simultaneous) requests have been made by the equipment connected to the SCU 50, is based on a priority hierarchy in which the ports have assigned an initial priority for each command level, but the priority within a command level changes (i.e., rotates) when a request within that command level has been serviced; however, the priority change is conditioned upon there not being a higher priority port request pending within that command level. The port servicing is based on levels of commands from the equipments attached to the SCU 50, the preferred embodiment of the SCU 50 including two levels of commands, high and low. The acceptance operation of the preferred embodiment of the present invention will now be described in conjunction with FIGS. 2, 3 and 4. FIG. 3 shows a timing diagram of requests having the same command level for the same memory unit, one request being made a clock time (T-TIME) later. FIG. 4 shows a timing diagram of requests having the same command level, from the equipments, being made simultaneously, i.e., the same clock time. It should be noted here that the SCU 50, memory 20, and SCU-equipment interface timing is on a synchronous basis.

Referring to FIG. 3, there is shown a clock signal, also referred to as timing [definer]CLK-DEF. A clock period is referred to as a T-TIME. A second clock signal (or timing non-definer, is shown whereby a clock pulse is generated every half period of a T-TIME. In the example of FIG. 3, a request from the CPU 30 for memory 0 occurs at the start of the $T_0$-TIME. This request is via interconnect line 31. A request present signal outputted from port 1 51-1 (P1-REQ-PRES) is outputted at the start of $T_1$ and coupled to the corresponding port 1 request control 52-1. Also at the start of $T_1$ a request from the I/O unit 40 is made requesting memory 0, this request being made via interconnect line 41. A T-TIME later, i.e., the start of $T_2$, port 0 51-0 outputs the request present signal (P0-REQ-PRES) and is coupled to the port 0 request control 52-0. However, during the $T_1$ time, the port 1 request control logic 52-1 and the activity priority select control logic 56 caused the accept request signal for port 1 (P1-ACPT-REQ) to be generated and coupled back to port 1 51-1. As a result, at the start of $T_2$ the memory unit 0 200 has been selected and caused to indicate a busy condition such that when the port 0 request control logic 52-0 processes the request present signal from port 0, the memory requested will be unavailable thereby holding up (i.e., low or inactive) specific request signals (P0-PREQ-GO, P0-LPREQ-PRES, P0-HPREQ-PRES, and P0-HPRI-REQ) to the activity priority select control 56.

Referring to FIG. 4, there is shown the control signals generated as a result of simultaneous requests (the timing of FIG. 4 shows a two-word write to memory operation, the requests can be for any command within the same command level). During the $T_0$ time, requests from the I/O unit 40 and the CPU unit 30 are made via interconnect lines 41, 31, respectively, at the start of the $T_0$ time. The information contained on the interconnect lines 41, 31 include address, zone, data, and command-/control information. Port 0 51-0 and port 1 51-1 perform some processing on the command and address information during the $T_0$ time such that the respective memory select bits (0-3) are coupled to the memory unit busy control 54, and command bits (0-5) are coupled from the respective port 51 to its corresponding port request control 52.

Address bits (0-27), command bits (0-5), and zone bits (0-3) from each port 51 are coupled to the activity registers logic unit 58. In the preferred embodiment of the SCU 50 a 36-bit CPU word is utilized (plus 4 additional parity bits), each word having four nine-bit bytes. The zone bits identify a byte within a word, and the address bits define the address of the memory location and the memory unit. In response to the request for the corresponding equipment, port 0 generates the port 0 request present signal (P0-REQ-PRES) and port 1 51-1 generates the port 1 request present signal (P1-REQ-PRES) at the start of the $T_1$ time. As a result, port 0 request control 52-0 and port 1 request control 52-1 couple the corresponding specific request signals (PX-PREQ-GO, PX-LPREQ-PRES, PX-HPREQ-PRES, and PX-HPRI-REQ, where X =0 for port 0 and X=1 for port 1) to the corresponding activity priority select control 56. At this point the priority select logic of activity priority select control 56 becomes operative and as a result, a decision is made to accept one of the requests from either port 0 or port 1, the request being accepted being the request from the port having the highest priority. This determination is made during the $T_1$ time. If the command priority levels of the access request common are equal, the port having the highest port priority is serviced first within that command priority level. If the command priority levels are unequal, the port with the highest command priority level is serviced first. As a result of the operation of the priority select logic of the activity priority select control unit 56, the accept request signal is generated for port 0 (P0-ACPT-REQ), this signal being coupled back to port 0 51-0 before the start of the $T_2$ T-TIME (assuming for purpose s of example here that port 0 has the higher priority at this time). If the memory unit selected by port 1 is different than the memory unit selected by port 0, and the bus 220 would be available during the proper time, and other conditions are met (namely, logic required to perform the command is available at the correct time, i.e., the time the command is actually executed), the port 1 request will be accepted during the $T_2$ T-TIME (the P1-ACPT-REQ signal shown in FIG. 4 by the dotted line. This signal would be coupled back to port 1 51-1 before the start of the $T_3$ T-TIME). The start of the start activity signal (START-ACT) starts the memory cycle and the memory unit selected by the port 0 request indicates a busy condition. The remainder of the signals shown in FIG. 4 basically show some of the memory interface timing. During $T_2$ the address bits ADR (0-27) and the zone bits (0-3) and the command to memory are coupled to the memory 20. In addition, the data from the port (PC-DTA), in this case port 0, is coupled to the activity registers 58, the first 40-bit word being available the first half of the $T_2$ time and the second 40-bit word being available to the activity registers 58 during the second half of the $T_2$ time. The 40 bit word of the preferred embodiment of the DPS 10 includes the 36 bit data word plus four parity bits. The data to be written into memory is then placed on the bus 220 during the $T_4$ time. During the $T_6$ time the memory status word is read from the memory 20 to the SCU 50. This cycle makes up the minimum write cycle time of the system of the preferred embodiment.

The various signals received via the interconnect lines 31, 41 by the port 51 are registered within the port logic (not shown) during the $T_0$ time. As a result, the various signals required to process the request (PX-REQ-PRES wherein X indicates port 0-7), the command signals (PX-CMD[0-5]), the memory select signals (PX-MEM-SEL)[0-3]), and the address and zone signals (P0-ADR[0-27] and PX-ZONE[0-3]), are available to the remaining logic of the SCU 50.

Before proceeding with a detailed discussion of the operation of the SCU 50, an overview of the operation of the SCU 50 in granting access to the memory 20 in response to requests from the equipment is summarized here by an example. Assume a data processing system has an SCU 50 with eight ports numbered 0-7. During a predetermined time period, further assume the port priority and the command priority level are as shown in Table 2, the command priority level being fixed and the port priority being (conditionally) rotatable. Assume still further that during the predetermined time period a request command having command priority level D is present on port 6 and a request command priority having command level B is present on port 2. Because the requests are simultaneous (i.e., during the same predetermined time period), the priority logic must determine which request is to be granted (or serviced). Because the request from port 2 is a B level command, and since the B level is a higher priority level than the D level, the request on port 2 will be granted access over the request on port 6 (i.e., the request on port 6 is bypassed). The command priority level is considered first in the priority hierarchy. Then if there is no request pending in the B command level from a port having a higher port priority, the port priority would be rotated such that port 2, i.e., the port just serviced would have the lowest port priority. Thus, the rotation is within a command level. In the above sequence (before the rotation), if a port request having a B command level was pending for any of the ports 5, 6, 7, 0, 1, but these ports did not have a go-condition due to unavailability of hardware to grant the request, the rotation within the B command level would be inhibited. Although not shown in Table 2, there exists an A command level, a C command level, and a D command level port priority.

TABLE 2

| PORT PRIORITY (ROTATABLE) | | COMMAND |
|---|---|---|
| FOR B COMMAND LEVEL | FOR D COMMAND LEVEL | LEVEL (FIXED) |
| (HIGHEST) 5 | 6 | A (HIGHEST) |
| 6 | 7 | B |
| 7 | 0 | C |
| 0 | 1 | D |
| 1 | 2 | E |
| 2 | 3 | |
| 3 | 4 | |
| 4 | 5 | |

Figure 5:
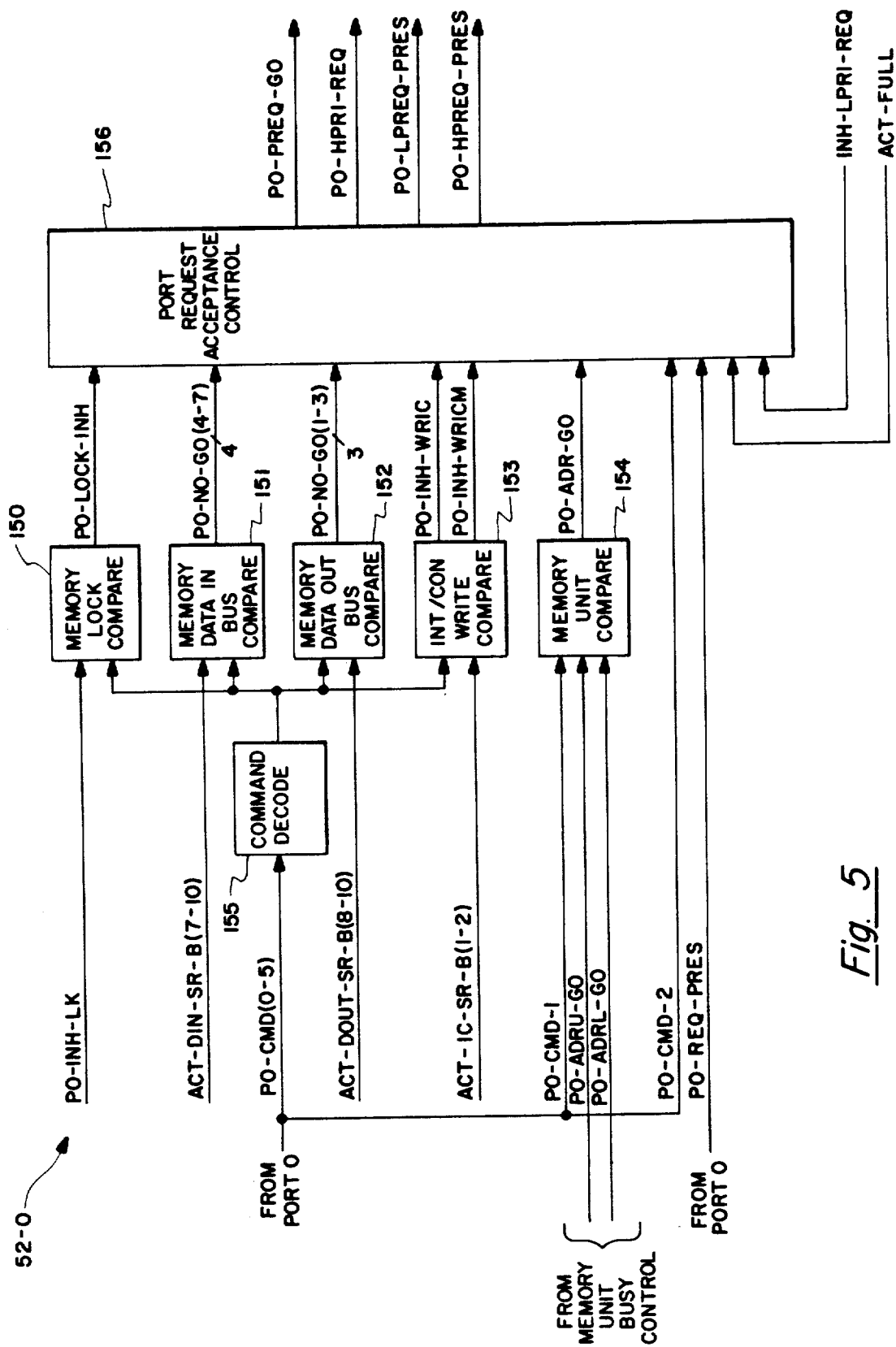
FIG. 5 shows a functional block diagram of the port request control unit of the system control unit which utilizes of the present invention.

Referring to FIG. 5 there is shown a functional block diagram of the port request control 52. The request present signal and the command signals are received from the corresponding port along with various control signals from the memory unit busy control unit 54 and the activity registers 58. (Note that the signal designation of the port request control unit 52 shown in FIG. 5 has the reference numerals specifically related to the port 0 request control 52 - 0. However, this logic is repeated for each of the port request control units 52 having the specific PX signal, where X specifies the respective port.) The inhibit lock signal, P0-INH-LK is a control signal generated in response to read lock commands, which direct the SCU to lock all memory units against read lock and write honor lock commands from other ports. The memory units are unlocked by the next serviced command from the original locking port. The activity registers 58 include a plurality of shift registers, each position of the shift register corresponding to a time slot in which the memory input bus or the memory output bus of bus 220 will be active as a result of an activity which has been accepted. The data in a shift register of activity registers 58 forms control signals (ACT-DIN-SR-B[7-10]) which indicates an anticipated input bus busy condition during a future time period and is coupled to a memory data-in bus compare unit 151. Similarly, if data is to be read from a memory unit as a result of an activity, a second shift register of the activity registers 58 indicates the time slot the data output bus of bus 220 will be busy, predetermined bits (bits 8-10) of the second shift register forming control signal ACT-DOUT-SR-B(8-10) and is coupled to the memory data out bus compare unit 152. Similarly, interrupt/connect queues which are internal registers of the SCU 50 can also be accessed and a control signal ACT-IC-SR-B(1-2), indicating some internal logic of the SCU 50 will be busy, is coupled to an INT/CON write compare unit 153. Control signal ADRU-GO from the memory unit busy control 54 indicates whether the upper memory units, memory units 0-7 (200-207) are available, and control signal ADRL-GO indicates whether the lower memory units, memory units 8-15 (208-215), are available these control signals being coupled to the memory unit compare 154. The outputs of each of the compare units 150-154 are coupled to the port request acceptance control 156. If the memory and bus required for the commanded operation are not busy and the logic required for the commanded operation is available during a predetermined future time period(s), the port request acceptance control 156 outputs the predetermined specific request signals to the activity priority select control unit 56.

Figure 6:
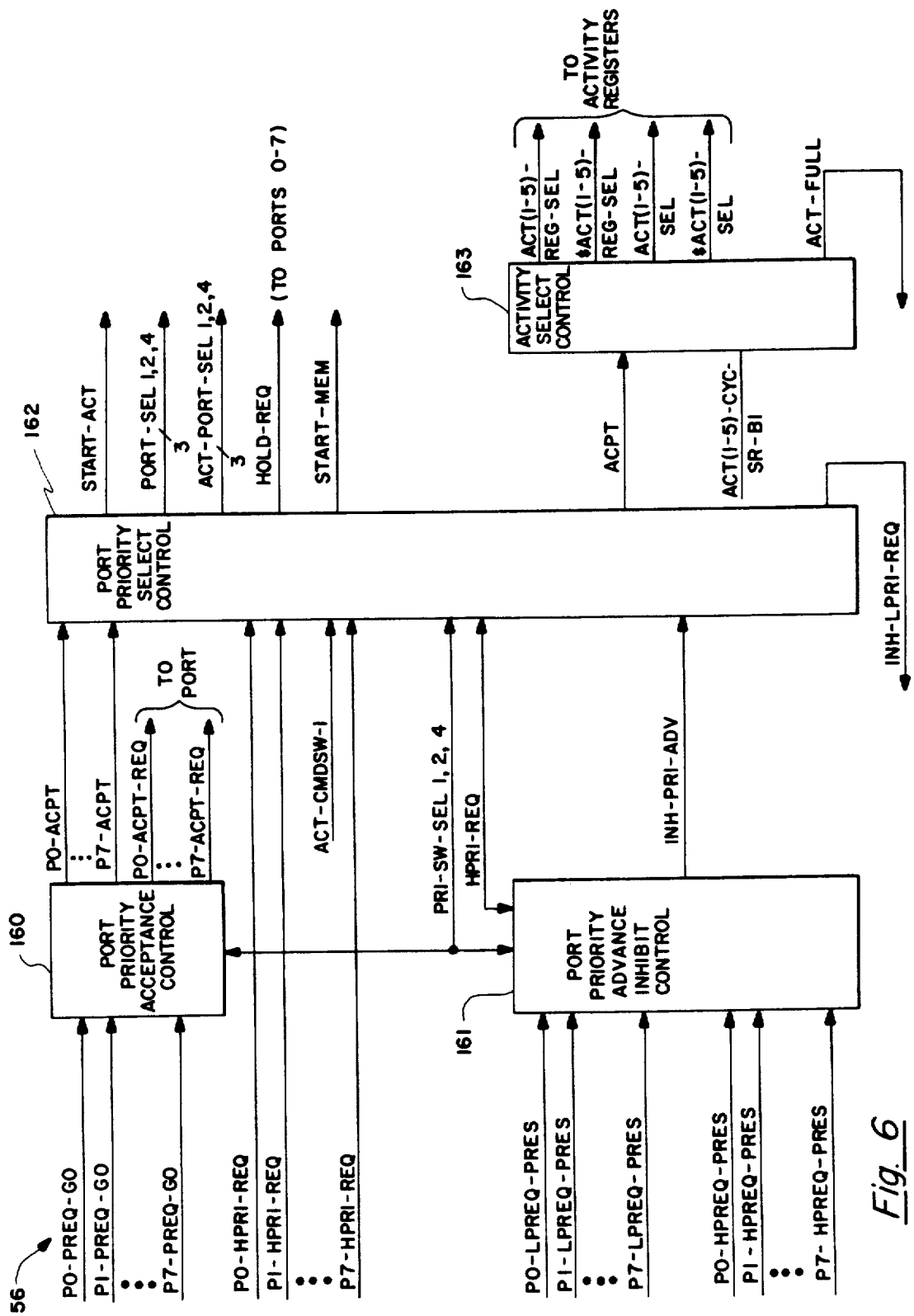
FIG. 6 shows a functional block diagram of the activity priority select control unit of the system control unit which utilizes the circuit of the present invention.

Referring to FIG. 6, there is shown a functional block diagram of the activity priority select control 56. A port priority acceptance control unit 160 receives the request present go signal (PREQ-GO) from each of the port request control units 52 one or more of which may be true, all these signals being within the same command level during a T-TIME. Based on these inputs, the logic of the port priority acceptance control 160 makes a decision to accept only one request during a given T-TIME, and outputs the acceptance request signal (PX-ACPT-REQ) to the corresponding port. After an acceptance, the port priority of the ports is conditionally rotated at the start of the next T-time. A port priority advance inhibit control unit 161 interfaces with the port priority acceptance control unit 160. The port priority advance inhibit control unit 161 receives the low priority request presence signals (LPREQ-PRES) and the high priority request presence signals (HPREQ-PRES) from each of the port request control units 52, and based on pending requests of higher port priority within the command priority level just accepted, the logic determines whether to inhibit or permit the rotation of the port priority acceptance control unit 160. A port priority select control unit 162 which receives an acceptance signal (ACPT) indicating which port has had a request accepted, and also receives other control signals, including the high priority request signals from each of the ports, generates control signals for loading the activity registers with the information required to perform the requested operation and also generates a start memory (START-MEM) signal which is also coupled to the memory unit busy control unit 54.

Figure 7:
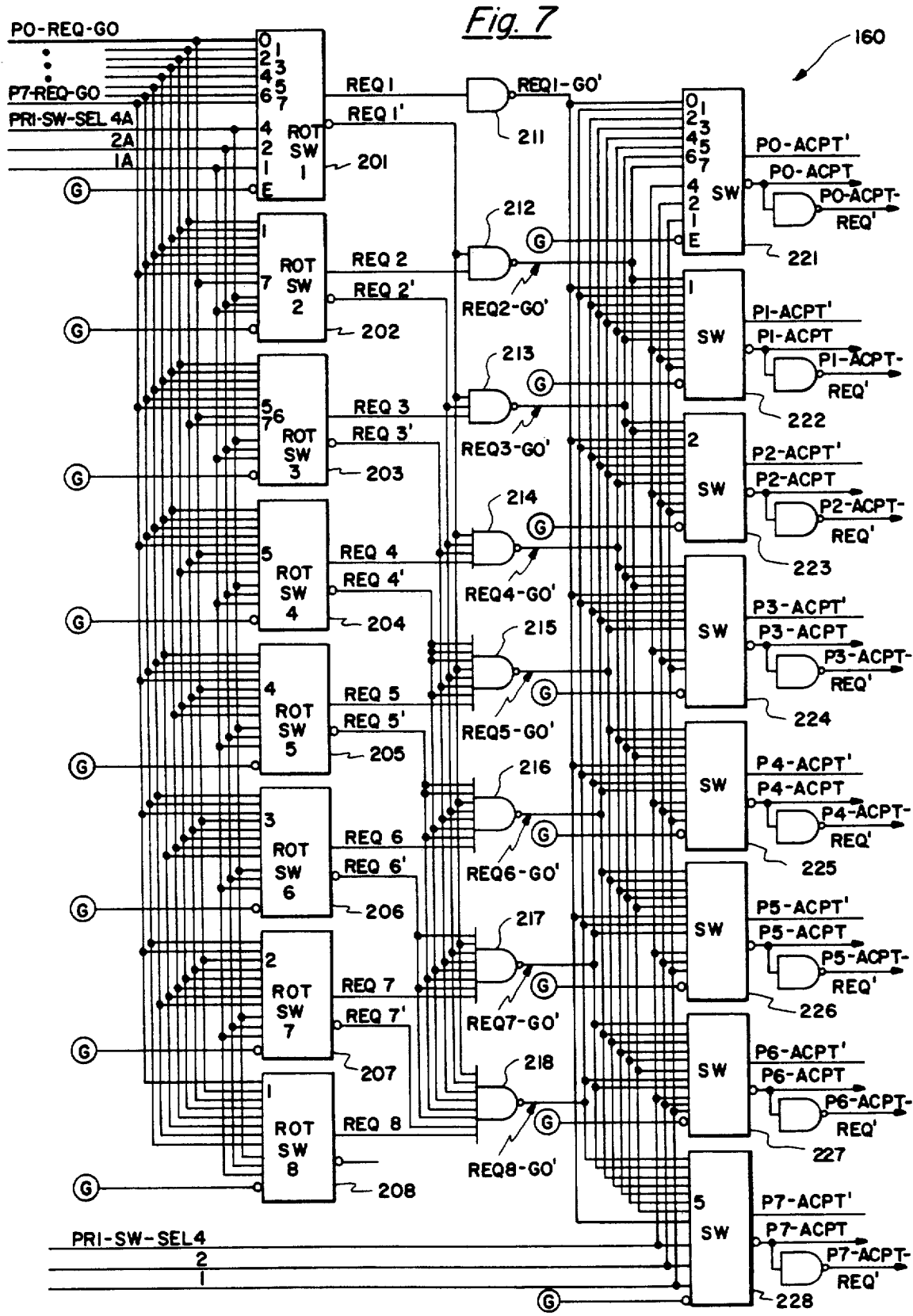
FIG. 7 shows a logic diagram of the port priority acceptance control unit of the activity priority select control unit of FIG. 6 which utilizes the circuit of the present invention.

The priority logic will now be described. The activity priority select control 56 comprises the port priority acceptance control 160, the port priority advance inhibit control 161, the port priority select control 162, and the activity select control 163, as described above. Referring to FIG. 7, there is shown a logic diagram of the port priority acceptance control 160. The port priority acceptance control 160 comprises a first plurality of switches, the rotation switches (ROT SW1-ROT SW8), 201-208 each rotation switch having eight inputs, 0 through 7. These rotation switches accept the PX-PREQ-GO signal from each port such that the P0-PREQ-GO signal is coupled to the 0 input on the first rotation switch 201, the seventh input position of the second rotation switch 202, the sixth input position of the third rotation switch 203, the fifth input position of the fourth rotation switch 204, the fourth input position of the fifth rotation switch 205, the third input position of the sixth rotation switch 206, the second input position of the seventh rotation switch 207 and the first input position of the eighth rotation switch 208. In a similar fashion, all the remaining PX-REQ-GO signals are coupled to a predetermined position of each of the remaining rotation switches 202-208. The output of each rotation switch is coupled to a corresponding NAND-gate 211-218. In addition, the complement (or bar) output of each rotation switch is coupled to each NAND gate below it in order of priority as will now be described. First rotation switch 201 being associated with NAND-gate 211, has a higher priority than the second rotation switch 202; hence, the bar output of the first rotation switch 201 is coupled to the second NAND gate 212 and to each NAND-gate 213-218 below it. The NAND-gates form the priority tree of the port priority acceptance control logic 160. A second plurality of switches, steering switch, 221-228 are coupled to the priority tree such that the output of second switches couples the acceptance signal back to the correct port based on the rotation of the priority. The select positions of the steering switches 221-228 and the rotation switches 201-208 have coupled thereto selection control signals, PRI-SW-SEL4,2,1 and 4A,2A,1A, respectively. These selection control signals correspond, i.e., are logically the same signal. As an example, when the selection control signals have a binary value of 010, the third input terminal (i.e., the two [2]input) of each of the rotation switches 201-208 is selected thereby giving port 2 the highest priority. If a request is made by port 2, the REQ1 signal would indicate an acceptance; however, each of the steering switches 221-228 would also be selecting the two (2) input. This corresponds to an active input on the two (2) input of third steering switch 223 which drives the P2-ACPT signal, which is coupled to port 2. Each of the rotation switches 201-208 and steering switches 221-228 are similar to a TI 74S151 type eight to one select switch.

First NAND-gate 211 outputs the request signal having the highest priority. The highest priority port is achieved by the select signals PRI-SW-SEL and is rotated as will be described hereinunder. Initially, when the select input of the switches is all 0s, port 0 coupled to input 0 of rotation switch 201 will have the highest priority. When the select signals equal 001 binary, then the one input of each of the rotation switches 201-208 will be enabled. At this point in time, since the port 1 input request signal, P1-PREQ-GO, is coupled to input 1 of ROT SW1 201, this input will be coupled to the highest priority NAND-gate 211 of the priority tree; hence port 1 will have the highest priority. Further, at this point in time, the one input of the second rotation switch 202 coupled to the port 2 input request signal will have the second highest priority, and so forth down the line. Hence, each port can be available to the highest priority NAND gate of the priority tree in accordance with the rotation scheme described hereinunder.

Figure 8:
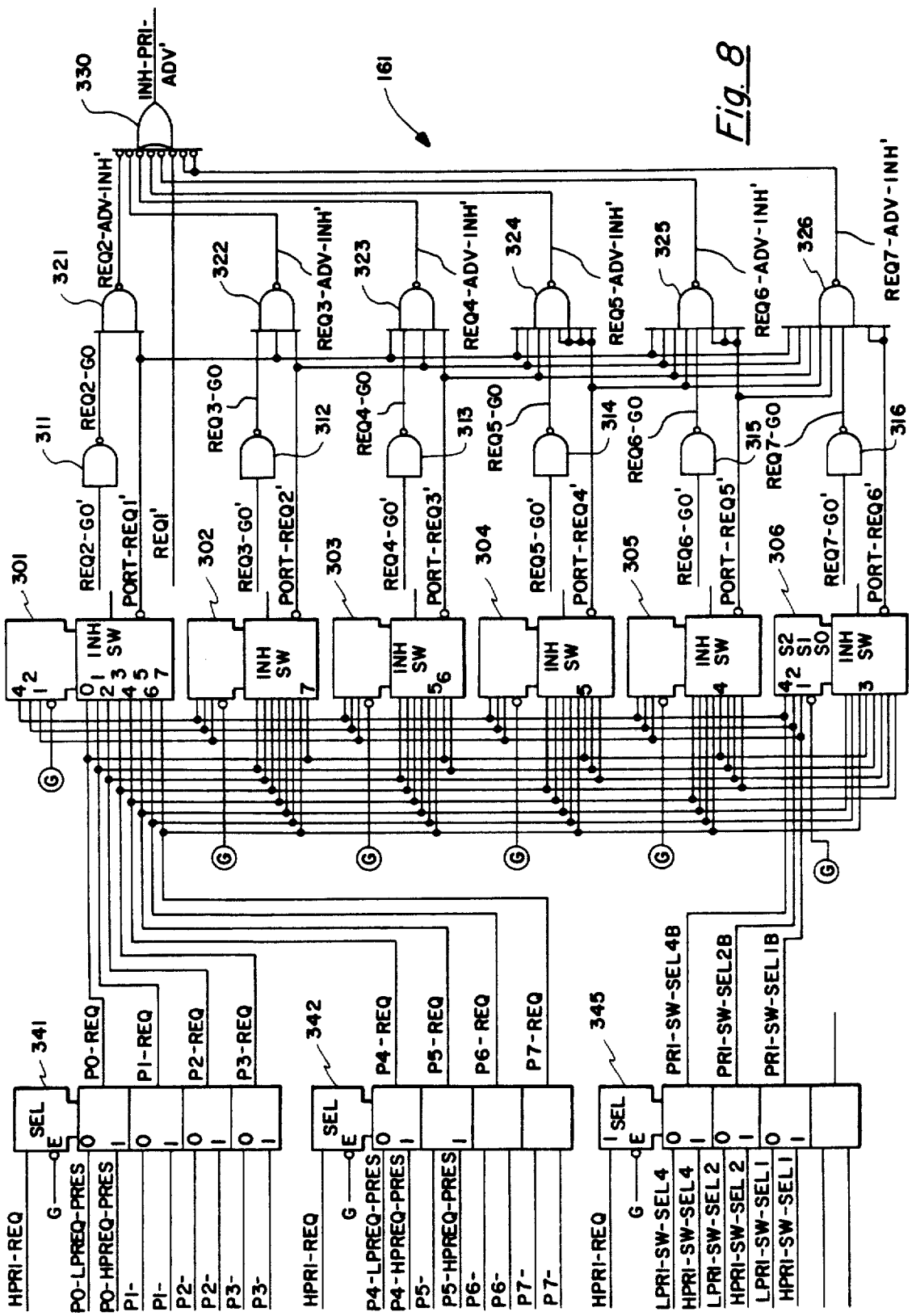
FIG. 8 shows a logic diagram of the port priority advance inhibit control unit of the activity priority select control unit of FIG. 6 which utilizes the circuit of the present invention.

The inhibiting of the rotation of the priority will now be described. Referring to FIG. 8, there is shown a logic diagram of the port priority advance inhibit control 161. The port priority advance inhibit control 161 has coupled thereto the low priority request present signal and the high priority request present signal, PX-LPREQ-PRES and PX-HPREQ-PRES, respectively, from each of the ports. The high priority request present signal and the low priority request present signal is coupled to the corresponding one (1) and zero (0) inputs, respectively, of a two-to-one selector (SEL) 341, 342. Coupled to a select input of the selectors 341, 342, is the high priority request signal, HPRI-REQ, and operates such that if a high priority request is present for any of the 8 ports, this signal is high, i.e., a logic one, indicating a high priority request is present on at least one port. Each of the outputs from the selectors 341, 342 is coupled to a predetermined input of inhibit switches (INHSW) 301-306. The coupling arrangement followed is similar to the arrangement followed for the wiring of the rotation switches described above; namely, the output position of the selector 341 which indicates the port 0 request, P0-REQ, is coupled to the 0 position of the first inhibit switch 301, the seventh position of the second inhibit switch 302, the sixth position of the third inhibit switch 303, .... A third selector 345 also generates selection control signals corresponding to those described above in conjunction with the rotation and steering switches. In order to describe the inhibit process assume, for example, that the select control signals, PRI-SW-SEL4B,2B,1B, have a binary value of 1 0 1. This corresponds to selecting port 5 as having the highest priority since the sixth input terminal (position 5) of rotation switches 201-208 will be selected, and the port 5 signal is coupled to input position 5 of first rotation switch 201, as shown in FIG. 7. In this case the priority order will be 5, 6, 7, 0, 1, 2, 3, and 4. Assume that a high priority request is pending for port 5, a high priority request is pending for port 7, the port 5 request go signal (P5-REQ-GO) is not active since, for some reason, eg, the memory requested by port 5 is busy but the memory requested by port 7 is available and hence the port 7 request go signal, P7-REQ-GO, is present. As a result, port 7 request go signal coupled to input position 5 of rotation switch 203 will generate the request 3 signal, REQ3, which is coupled to input terminal 5 of steering switch 228 which in turn outputs the accept signal to port 7. Because in this example the high priority request signal is present for port 5 and since the position 5 input of inhibit switch 301 is selected, the output of inhibit switch 301 will contain a zero. As a result, since the output of inhibit switch 301 is coupled to each of the inhibit NAND-gates 321-326, each will have a 0 input on one of the input terminals of the inhibit NAND-gates resulting in a 1 input to each of the inputs of the NOR-gate 303. This will result in a logic 0 output of the inhibit priority advance signal (INH-PRI-ADV'), a logic 0 of the inhibit priority advance signal inhibiting the priority advance. It can be readily seen that if the input port 5 did not have a request pending and port 6 had no request pending, REQ3-GO would be a logic 1. The output of inhibit switch 301 would also be a logic 1 and the output of inhibit switch 302 would also be a logic 1, resulting in a 0 output of inhibit NAND-gate 322. This output coupled to NOR-gate 330 would result in a logic 1 output of the inhibit priority advance signal, a logic 1 suppressing the inhibit of the priority advance of rotation switches 201-208. Switches 201-208 advance normally.

Figure 9:
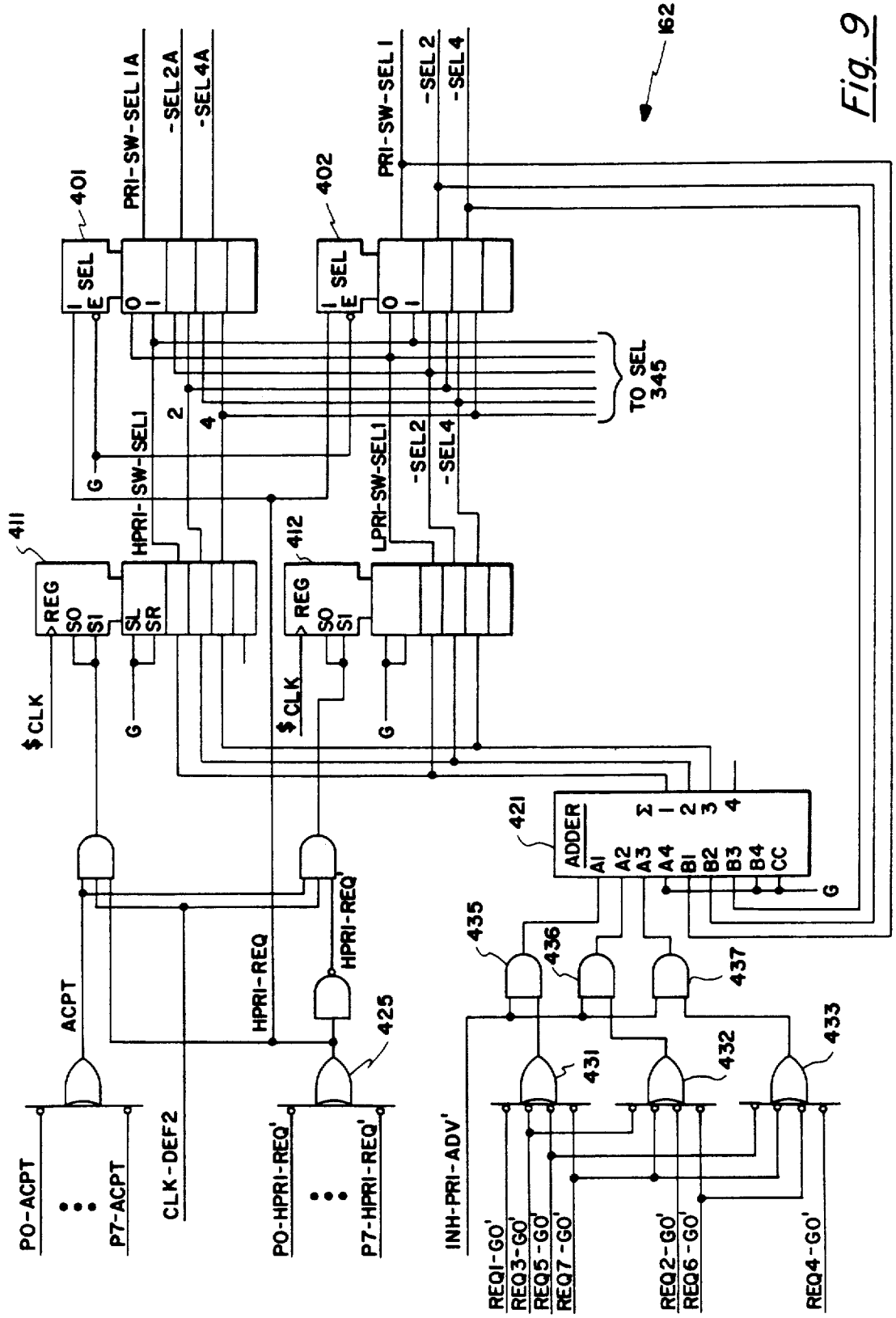
FIG. 9 shows a partial logic diagram of the port priority select control unit.

Referring to FIG. 9, there is shown some of the logic of the port priority select control 162. The generation of the select control signals for the rotation switches and selection switches, PRI-SW-SEL1A,2A,4A and PRI-SW-SEL1,2,4, are outputted from selectors (SEL) 401, 402. The select control selectors 401, 402 output the select control signals for either the low priority case or the high priority case. These select control selectors have the one (1) inputs connected to the outputs of a high priority register (REG) 411, and the zero (0) inputs connected to the outputs of a low priority register (REG) 412. The low priority register 412 contains the current rotation status for the low priority request (i.e., the low command level port priority list), and the high priority register 411 contains the priority status for the high priority request (i.e., the high command level port priority list). An adder 421 has the output of the selector 402 coupled to the B-inputs and the A-inputs of the adder 421 are connected to an input tree which indicates the port number which has been accepted. When a port has been accepted and rotation has not been inhibited, that port is placed at the bottom of the port priority list within the accepted command level and the next port in sequence is given the highest priority; hence, the rotation is not on a sequential basis and is rotated only after an acceptance has been generated, the port having been accepted being placed at the bottom of the port priority list. The priority list remains the same until an acceptance signal has been generated. The high priority signal, HPRI-REQ is generated by ORing the high priority request signals from each of the ports PX-HPRI-REQ, the ORing being accomplished by NOR-gate 425. The high priority request signal is utilized to select the output of the high priority register 411 or the low priority register 412 via the selectors 401, 402. Thus, for example, if the high priority status was such that port 0 was given highest priority the select control signals PRI-SW-SEL1,2,4 would be a binary 0 0 0. If a request go signal was available for port 4 and no other port was making a request, port 4 would be accepted. As a result, the input position 0 of rotation switch 205 which has the input request for port 4 would yield an output signal REQ5 at a logic 1. The bar output of all the rotation switches above switch 5, namely switches 1-4, 201-204, would have the bar output as a logic 1 resulting in the REQ5-GO' signal, the output of NAND-gate 215, at a logic 0. Hence, the output of NOR-gates 431, 432, 433, would be such that the outputs would be a 1 0 1, respectively. Further, since no higher priority requests are pending in this example, the inhibit priority advance signal is a logic 1, that is, the rotation is not inhibited. AND-gates 435, 436, 437 have an output of 1 0 1 binary, respectively, and the A inputs of the adder 421 would be a 5. The current value in the high priority register 411, corresponding to the select control signals is a 0, and on the next clock cycle the high priority register 411 would be incremented to contain the value 5. Thus on the next cycle the select control signal will have a value 5, thereby giving port 5 the highest priority. The implementation of the adder in the preferred embodiment of the SCU 50 adds every cycle. Thus, in order to maintain the same priority when no acceptance is generated and the priority advance is active, a count of zero is added by the adder 421, i.e., the A inputs have a value of zero set thereon. If there are no high priority requests and there are low priority requests, then the low priority request will be processed.

Figure 10:
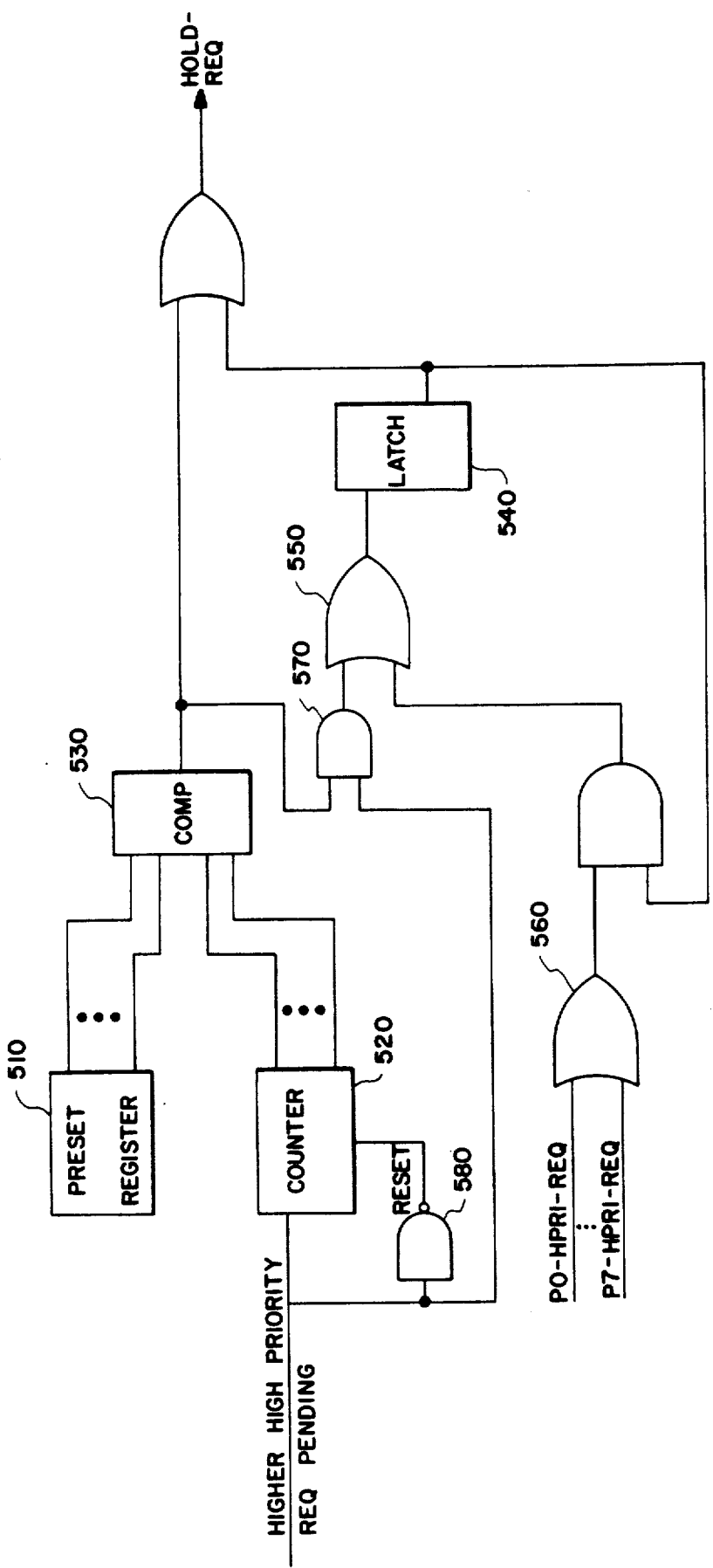
FIG. 10 shows a functional block diagram of the circuit of the present invention.

Referring to FIG. 10, there is shown a functional block diagram of the circuit utilized to generate the hold request (HOLD-REQ) signal. The hold request signal is a control signal transmitted to all the ports 51 indicating the ports 51 are to inhibit further requests from the equipments from being coupled to the corresponding port request control logic 52 when it is determined that a lower high priority request has been serviced a predetermined number of times over a pending higher high priority request. Each time a an access request command having a higher priority level from a port is pending and upon the servicing of an access request command having a lower command priority level from another port counter 520 is incremented and compared in a comparator 530 with a predetermined value set in preset register 510. The count (or value) set in preset register 510 is a predetermined count which the system will permit a a pending access request command having higher priority level from a higher priority port to be bypassed before locking out any further requests from the equipment connected to the ports. The preset register 510 can be a manually set value, or may be set via an interface (not shown) with other logic of the data processing system 10. When the number of times a pending access request commands having a higher command or port priority level has been bypassed is equal to the value set in preset register 510, comparator (COMP) 530 will output a signal, the signal being the hold request control signal which is then coupled to all the ports 51. The preferred embodiment of the ports 51 includes logic for inhibiting further requests from being accepted by the ports 51 until all the high priority type requests have been serviced once the HOLD-REQ signal is initiated. A latch 540 is included for maintaining the HOLD-REQ signal. When the compare hold request signal is generated (i.e., the output of comparator 530) its duration is dependent upon the next high priority acceptance. If the next high priority acceptance corresponds to the highest priority request pending, the counter 520 is reset via gate 580, and the hold request signal is reset. If the next high priority acceptance is not the highest high priority request pending (i.e., the priority is not rotated), the latch 540 is set via AND-gate 570 and OR-gate 550. If the latch 540 is set, it will remain set, held by anyone of the pending high priority port request signals from port 0 through port 7 inputted to OR-gate 560. The hold request signal then remains active until all the high priority requests have been serviced.

Figure 11:
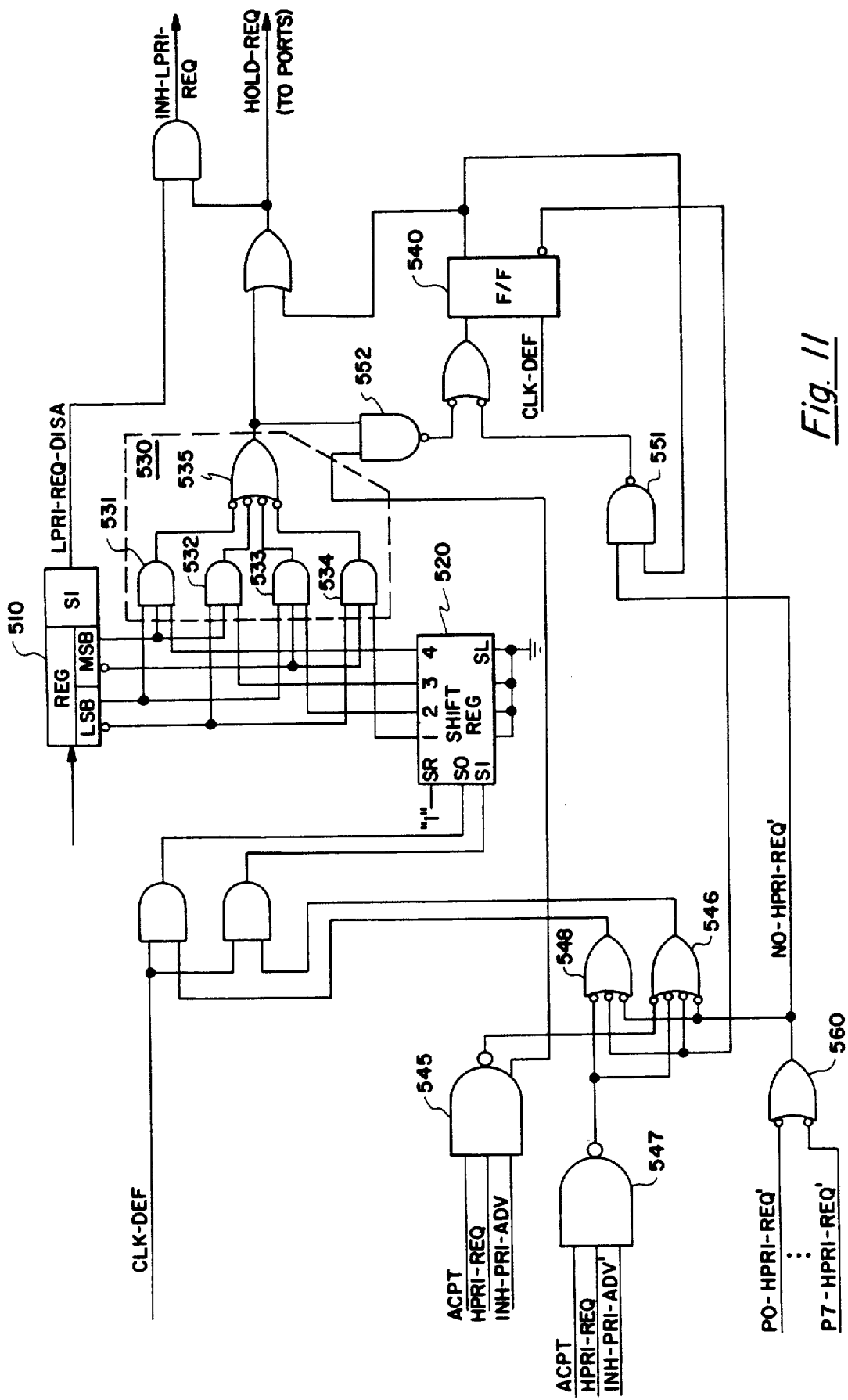
FIG. 11 shows a logic diagram of the circuit of the preferred embodiment of the present invention of FIG. 10.

Referring to FIG. 11, there is shown a logic diagram of the hold signal-generation circuit of FIG. 10. The counter 520 is implemented in the preferred embodiment as shift register 520. The comparator 530 of the preferred embodiment comprises AND gates 531-534 and OR gate 535. The preset register 510 of the preferred embodiment is a three stage register for storing control information including the count (or value) and includes a position for a least significant bit (LSB) of the count, a position for a most significant bit (MSB) of the count, and a control stage S1. As mentioned above, preset register 510 can be loaded from some external source as is well understood by those skilled in the art. The shift register 520 has an input terminal, SR, connected to a logic one. If an accept signal, ACPT, is generated and high priority requests are present, HPRI-REQ, these signals will be a logic one. As explained above, if a pending higher high priority request was not serviced, the rotation of the priority would be inhibited and the inhibit priority advance signal INH-PRI-ADV would be a logic one. In the case in which the accept signal is a logic one and INH-PRI-ADV is a logic one indicating the priority rotation was inhibited, signifies that a lower high priority request was serviced, and it is desirable to add one to the counter (shift register) 520. For this condition NAND gate 545 would have a logic zero output yielding a one output from OR gate 546. Presuming that the output of latch 540 is a logic zero, then the output of NAND gate 547 is a logic one from the conditions above, and the output from OR gate 548 is a logic 0. Thus, shift register control signals S0,S1 would be a logic 01, respectively, which results in the shift register 520 inputting a logic one into the first position of a shift register 520. Each time the shift register 520 is shifted right, the logic one value shifts one position to the right which is equivalent to adding a count of one. The contents of the shift register 520 is compared to the value set in preset register 510. In the preferred embodiment, a count of 1-4 (i.e. a binary value of 0-3) is valid, and is compared in comparator 530. When the count set in preset register 510 has been reached by shift register 520, the output of the comparator 530, OR gate 535, is a logic one generating the hold request, HOLD-REQ, signal. Once a hold request signal is generated, the hold request signal can be held, or latched, by latch 540 if the next port high priority request acceptance causes inhibiting the advance of the port high priority. The latch 540 is held by NAND-gate 551 as long as a high priority request signal is present on any port.

If an accept signal ACPT has been generated, i.e., a high priority request is present, and the priority advance has not been inhibited, i.e., the INH-PRI-ADV signal is a logic zero, the output of NAND gate 545 is a logic one and the output of NAND gate 547 is a logic zero. In this case, a port with the highest high priority is being serviced. This is not the condition meant to generate the hold request signal and as a result, the output of OR gates 546, 548 will both be a logic one resulting in the shift register control signal S0,S1 to be a logic 11, respectively. This condition resets the shift register 520 to a value of zero. If no accept signal has been generated, if no high priority request is present, and if no hold request signal is pending, the outputs of OR gates 546, 548 will yield a shift register control signal S0,S1 that will be a logic 00, respectively, and will effectively perform no operation on the shift register 520. After all the high priority requests which have been pending have been serviced, the latch 540 will be reset since the input from NAND gate 551 and the NAND gate coupling the output of the comparator 552 will be such as to reset the latch 540. The shift register 520 of the preferred embodiment can be implemented utilizing a TI 74LS158. A position S1 in the register 510, which can also be preset or set dynamically by the DPS 10, is utilized in the preferred embodiment to generate an inhibit low priority request signal (INH-LPRI-REQ), inhibiting servicing of all low priority port requests present when HOLD-REQ is present. Although the preferred embodiment of the present invention is to a two command levels (i.e., high and low), it will be understood by those skilled in the art that the present invention is also directly applicable to systems having a plurality of command levels.

Figure 12:
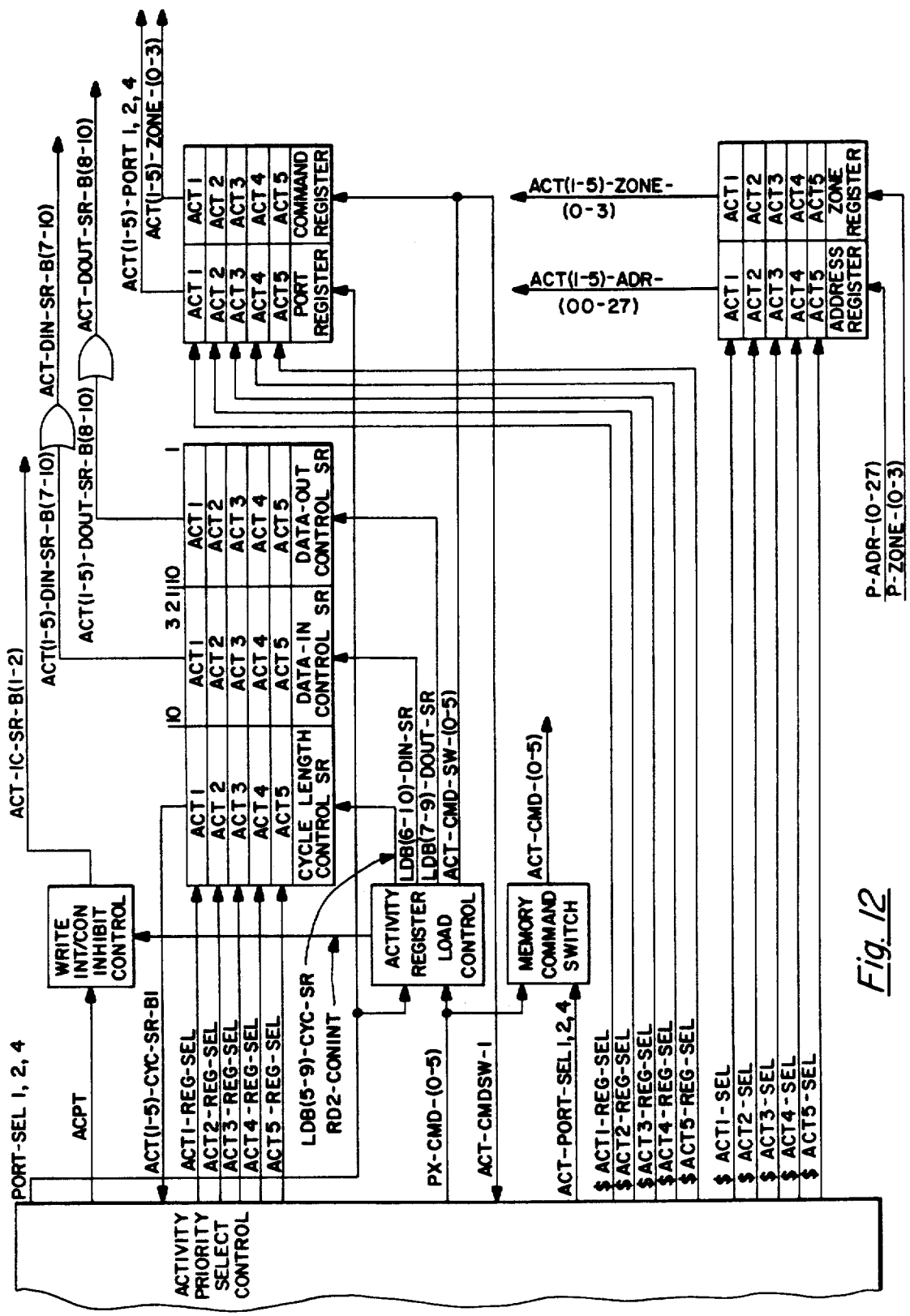
FIG. 12 shows a partial functional block diagram of the activity registers of the system control unit.
Figure 13A:
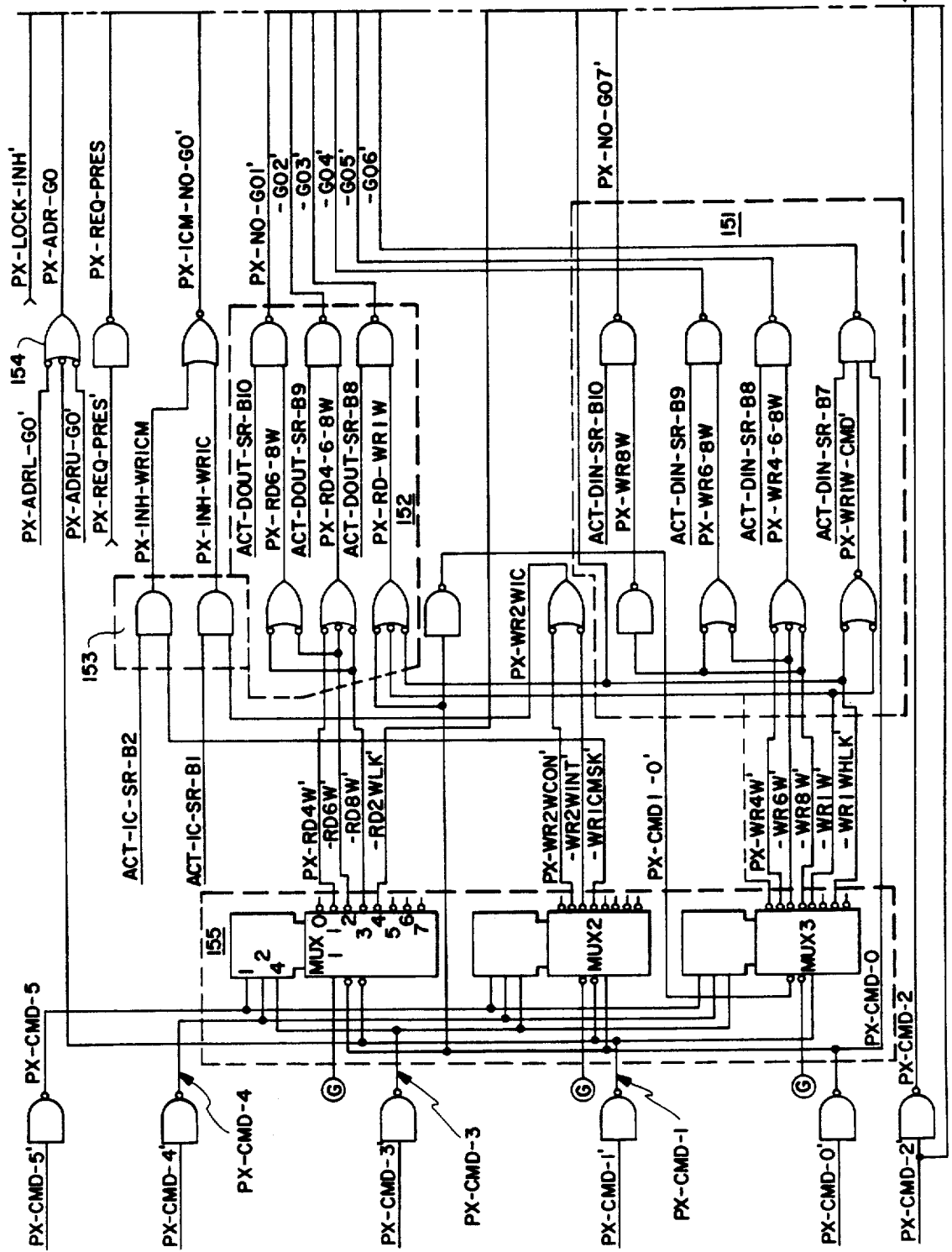

Referring to FIG. 12, there is shown a functional block diagram of some of the activity registers 58. As mentioned above, the preferred embodiment of the SCU 50 allows five activities to be accepted and in process simultaneously. Three of the activity registers (cycle length, data in, and data out) are shift registers, each position of the shift register denoting a time slot in which some predetermined logic of the SCU 50 and/or the memory 20 is to be utilized, thus allowing the SCU 50 to have knowledge of when various hardware or logic will be busy. Referring to FIGS. 13A and 13B, which taken together form FIG. 13, there is shown a logic diagram of the port request control 52. The command decode 155 is comprised of three MUXs, MUX1, MUX2, MUX3, and accepts the PX-CMD-(0-5) signal from its respective port. In addition, the various control signals from the activity registers 58 and the memory unit busy control unit 54 are combined and inputted to the port request acceptance control unit 156. If a high priority request is present, the activities are not full, the command type is for memory, the memory is available, the memory bus will be available for the specified command, and a request is present, GATE 160 outputs the port high priority request signal, PX-HPRI-REQ'. Bit 2 low of the command signal is utilized in combination with a request signal to generate the port low priority request present signal in GATE 161 (PX-LPREQ-PRES) and GATE 162 combines the command bit 2 high with the request present signal to generate the port high priority request present signal (PX-HPREQ-PRES). If a high priority request is present and all the logic and hardware is available at the time the operation will be performed, the high priority request go signal generated by GATE 163 is ORed with NOR-gate 164 to generate the port priority request go signal (PX-PREQ-GO). If a low priority request is present and the request is a go condition, i.e., all the logic and hardware required by the operation will be available at the prescribed time to perform the requested operation, and there is no high priority request signal present from any of the other ports, the port priority request go signal, PX-PREQ-GO will be generated by the output of gate 165. In this fashion the low priority request from each of the ports is separated from the high priority request. Thus, high priority requests will be processed first, more specifically, a request go signal inputted to the rotation switches 201-208 will either be high priority go signals or low priority go signals; the two will not be intermixed, and the high priority request signal will always have preference over the low priority request signal.

Figure 14:
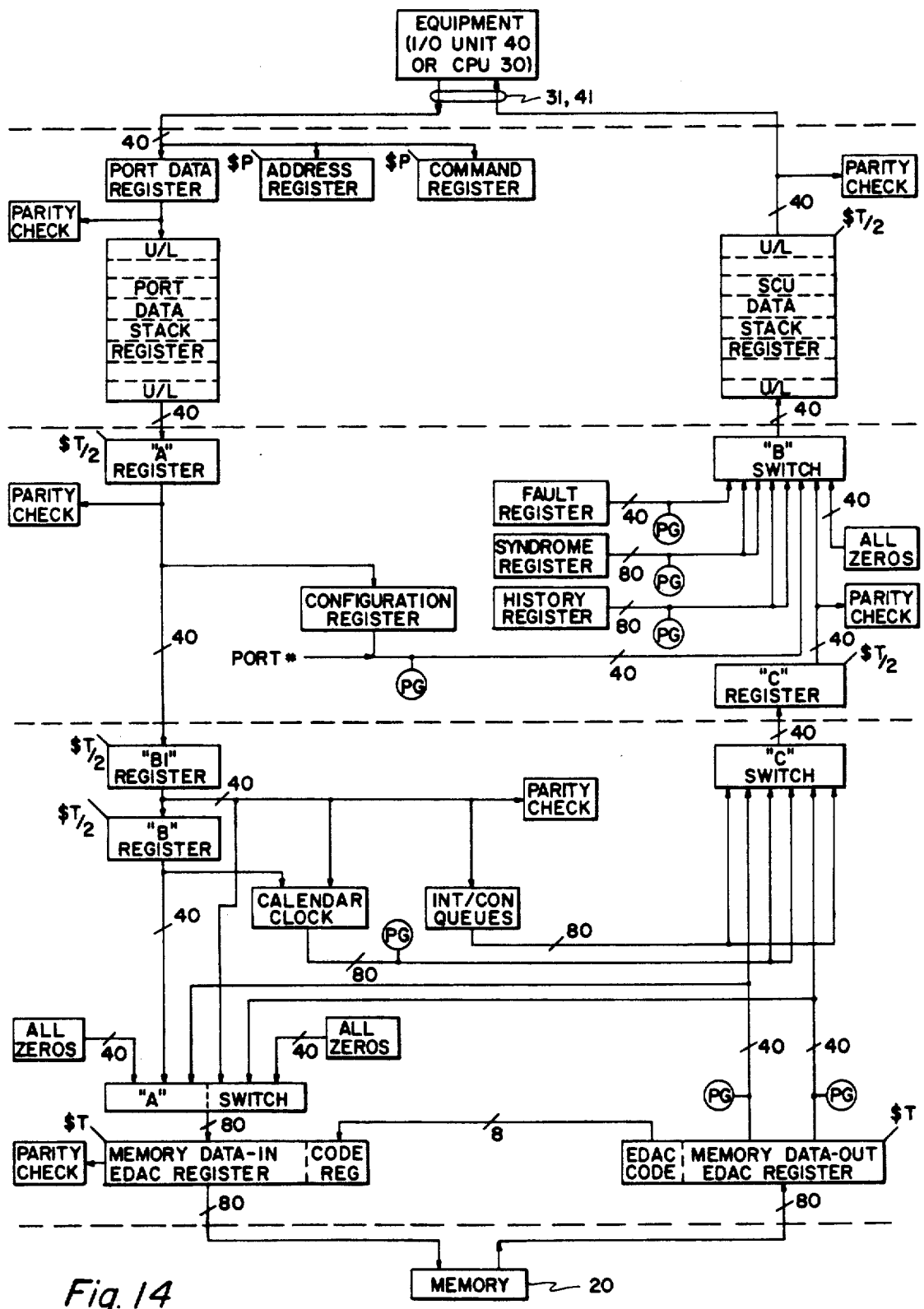
FIG. 14 shows a functional block diagram of the data registers which indicates the data flow of the data through the unit.

Referring to FIG. 14, there is shown a functional block diagram showing the data registers and the data flow of the data through the SCU 50.

Figure 15:
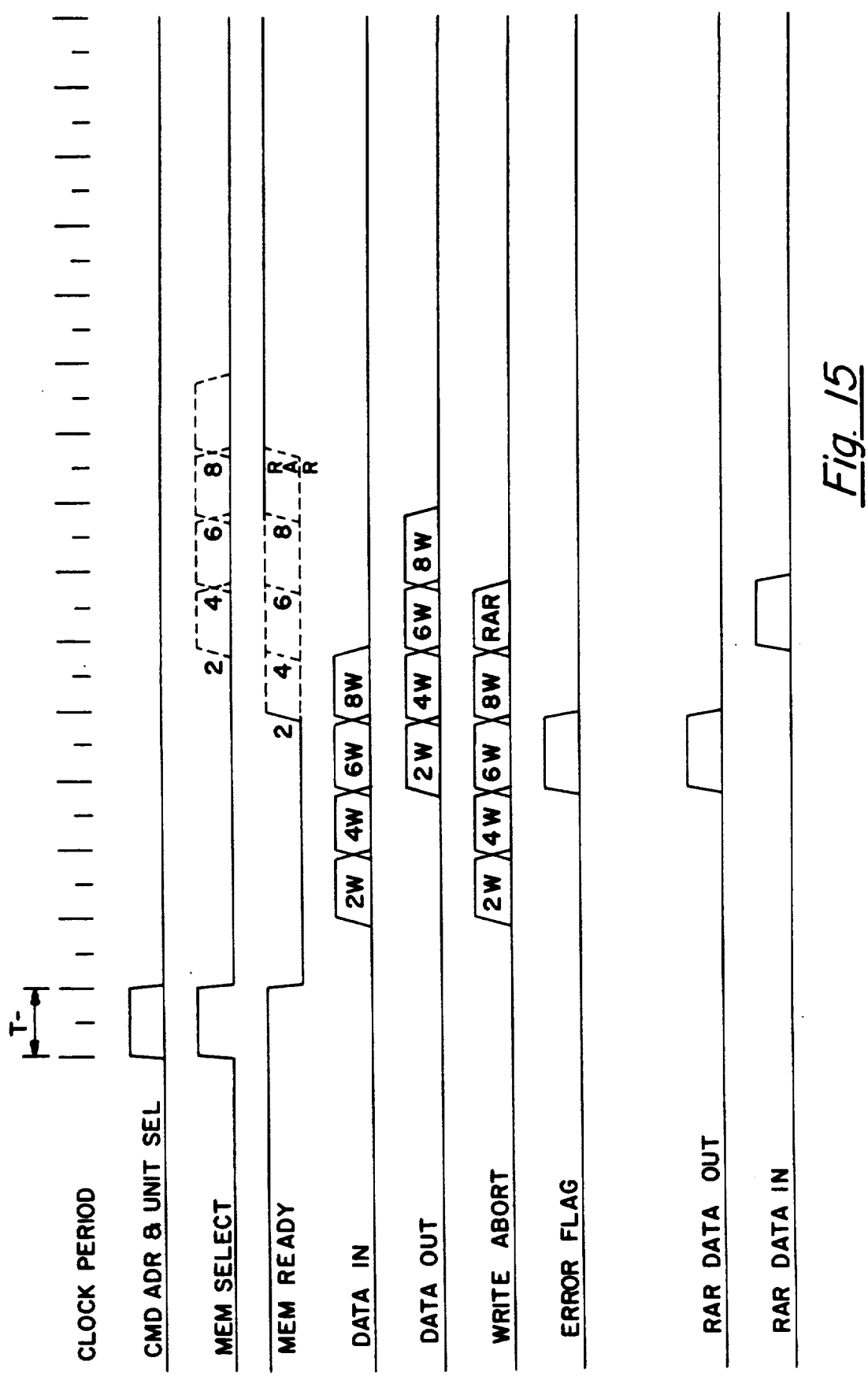
FIG. 15 a timing diagram of the memory interface of the preferred embodiment of the system control unit.

FIG. 15 shows a timing diagram of the memory 20 interface, delineating the time required for the two-word, four-word, six-word, and eight-word read or write (2W, 4W, 6W, and 8W, respectively). In addition the timing for the read-alter-write (RAR) is also shown.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

What is claimed is:

1. In a data processing system having a plurality of subsystems including a system controller having a plurality of ports for controlling access to at least one subsystem of the data processing system in response to access request commands from a plurality of equipment operatively connected to the ports of said system controller, each request for access applied to a port by an equipment has one of a plurality of command priority levels, one of said priority levels being the highest, each of the ports of the system controller having a different port priority relative to the ports for each given command priority level, the port priority levels of ports for a given command priority level being conditionally rotated when a request for access for equipment connected to a given port having the highest port priority is granted access by the system controller, said system controller including a circuit for preventing lock-out of access requests having a higher command priority level or a higher port priority, said circuit comprising:

a) counter means for counting the number of times access request commands having a lower command priority level or a lower port priority are granted access by the system controller while access request commands having a higher command priority or higher port priority are pending, the counter means producing a count value which is temporarily stored in said counter means; and b) compare means, operatively connected to said counter means, for comparing said count value of said counter means to a predetermined value, and for generating a control signal when said count value is equal to said predetermined value, said control signal being coupled to each of ports of the the system controller to inhibit the ports from accepting any further access request commands from the equipments connected to said ports.

2. The circuit for preventing lock-out of higher priority access request commands according to claim 1 further comprising: latch means operatively connected to said compare means for maintaining said control signal if an access request command accepted by the system controller after said control signal is produced does not have the highest command or port priority level, said control signal being maintained until all access request commands pending when said compare means produce said control signal have been granted access by the system controller.

3. The circuit for preventing lock-out of higher priority access request commands according to claim 2 further comprising: reset means operatively connected to said counter means for resetting said count value when all access request commands pending when the compare means produces said control signal have been granted access by the system controller.

* * * * *